US006779046B1

United States Patent
Osuga

(10) Patent No.: US 6,779,046 B1
(45) Date of Patent: Aug. 17, 2004

(54) SERIAL-DATA TRANSFER SYSTEM WHICH HAS A NORMAL MODE AND A LOCAL MODE AND DEVICES FOR THE SAME

(75) Inventor: Fumikazu Osuga, Tokyo (JP)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 09/536,040

(22) Filed: Mar. 27, 2000

(30) Foreign Application Priority Data

Mar. 30, 1999 (JP) .......................................... 11-088525
Mar. 30, 1999 (JP) .......................................... 11-088526

(51) Int. Cl.[7] ............................................... G06F 3/00
(52) U.S. Cl. ................................. 710/14; 710/4; 710/3
(58) Field of Search .............................. 710/48, 20, 21, 710/36, 14, 8, 3, 4; 340/2.1, 2.4; 370/445, 431

(56) References Cited

U.S. PATENT DOCUMENTS

| 5,214,647 A | * | 5/1993 | Komatsu ................... 370/445 |
| 5,600,310 A | * | 2/1997 | Whipple et al. ............ 340/2.4 |
| 6,011,921 A | * | 1/2000 | Takahashi et al. ........... 710/48 |

FOREIGN PATENT DOCUMENTS

| JP | 06223034 A | * | 8/1994 | ........... G06F/13/38 |

OTHER PUBLICATIONS

"Philips Semiconductors Desktop Video Data Handbook," *The 12C-bus and how to use it*, Jun. 1994, p. 2–163 to p. 2–181.

* cited by examiner

*Primary Examiner*—Jeffrey Gaffin
*Assistant Examiner*—Joshua D Schneider
(74) *Attorney, Agent, or Firm*—Oliff & Berridge, PLC

(57) ABSTRACT

A serial-data transfer system can concurrently transfer the same data from a master device to an optional number of slave devices. In the a serial-data transfer system, at least one master device and a plurality of slave devices are connected via a serial-data line for transferring data and a serial-clock line for transferring clock signals controlling the data transfer. In a normal mode, address information corresponding to an inherent address of each of the slave devices is transmitted from the master device to each of the slave devices, and interactive data communication is performed between the master device and the slave devices each having an inherent address matching the address information. In a local mode, address information corresponding to a common address is transmitted from the master device to a plurality of the slave devices which is intended to be specified, thereby specifying the plurality of the slave devices and concurrently transmitting the same data to the plurality of the slave devices.

16 Claims, 14 Drawing Sheets

NORMAL MODE

LOCAL MODE

WHEN SEL1H = H

WHEN SEL1H = L

SERIAL-DATA TRANSFER SYSTEM WHICH HAS A NORMAL MODE AND A LOCAL MODE AND DEVICES FOR THE SAME

BACKGROUND OF THE INVENTION

1. Field of Invention

The present invention relates to a serial-data transfer system for transferring serial data between at least one master device and slave devices.

2. Description of Related Art

Data communication may be performed in units of 8-bit data (1-byte data), for example, between a microcontroller and its peripheral devices. As is represented by, for example, an IIC($I^2C$)-bus (inter-IC control bus (which is simply referred to as an IIC bus, hereinbelow)), a serial-data transfer system serially transfers data between a master device that transfers data in units of 8-bit data and a plurality of slave devices.

In a serial-data transfer system that uses the aforementioned IIC bus, a master device on a controlling side, for example, a microcontroller, and a plurality of slave devices on the controlled side, for example, peripheral devices, are connected to each other via two two-way serial lines connected to a power source via pull-up resistors. The serial lines are a serial-data line (SDA) for transferring data and a serial-clock line (SCL) for transferring clock signals that control the data transfer.

Basically, the serial data line varies while the serial clock signal SCL is at a low level. While the signal SCL is at a high level, if the serial data line varies from a high level to the low level, it represents a start signal (START) for starting data transfer. If the serial data line varies from the low level to the high level, it represents a stop signal (STOP) for terminating the data transfer.

The master device first outputs a 1-bit start signal to the serial data line. Subsequently, it outputs 8-bit data serially in the order from the most significant bit (MSB) to the serial data line. The 8-bit data consists of a 7-bit inherent address that is uniquely preallocated to each of the slave devices and a subsequent 1-bit data-control signal that represents one of commands for a data-write to each of the slave devices and for a data-read therefrom.

The individual slave devices serially receive the 8-bit data outputted by the master device to the serial data line in synchronization with clock signals fed from the serial-clock line. Then, each of the slave devices compare the data with their own preallocated inherent address. As a result, the slave device having the inherent address that matches the data outputs acknowledge signal (affirmative response signals).

The master device verifies the acknowledge signal that the individual slave device outputted to the serial data line, then, serially outputs the 8-bit data, which will be transferred, to the serial data line when data-write to the slave device is required. The slave device that outputted the acknowledge signal serially receive the 8-bit data outputted from the master device to the serial data line, and then, similarly output the 1-bit acknowledge signal.

The master device transfers data consisting of a predetermined number of bytes depending on the requirement. Thereafter, the master device outputs 1-bit stop signal to the serial data line, and the slave device receives the stop signal and verifies termination of the data transmission. Thereafter, similarly, the master device serially specifies the slave device and repeats the data transfer.

In the serial-data transfer system employing the IIC bus, the plurality of slave devices must be accessed one by one. Therefore, even in a case of transferring data including the same control signal, such as a start, stop, or abort signal, which controls a plurality of the identical devices to be connected to the identical slave devices, the plurality of slave devices cannot be concurrently controlled.

To solve the problems, conventional serial-data transfer system take countermeasures such as having the control signals directly connected from the master device to individual apparatuses connected to a plurality of the slave devices for concurrent control purposes. Or, when concurrent control cannot be performed, an alternative counter measure taken is having the frequency of clock signals fed from a SCL increased, thereby transferring data to the plurality of slave devices so as to reduce the difference in time for control.

However, when the master device is directly connected to the apparatuses connected to the slave devices, in addition to the serial data line and the serial-clock line, the number of the lines must be increased, thereby decreasing advantages in the serial data transfer. Even when the frequency of the clock signal is increased, since the same data is repeatedly transferred to the individual slave devices, longer transfer time is required in proportion to increase in the number of the slave devices.

SUMMARY OF THE INVENTION

In view of the problems with the conventional art, an object of the present invention is to provide a serial-data transfer system that allows a master device to transfer the same data to a plurality of slave devices.

To achieve the above object, according to one aspect of the present invention, there is provided a serial-data transfer system wherein at least one master device on a controlling side and a plurality of slave devices on a controlled side are connected via a serial-data line for transferring data and a serial-clock line for transferring clock signals which control the data transfer; in a normal mode, address information corresponding to an inherent address of each of the slave devices is transmitted from the master device to each of the slave devices, and interactive data communication is performed between the master device and the slave device having an inherent address matching the address information; and in a local mode, address information corresponding to a common address is transmitted from the master device to a plurality of the slave devices which is intended to be specified, thereby specifying the plurality of the slave devices and concurrently transmitting the same data to the plurality of the slave devices.

Also, according to the present invention, there is provided a serial-data transfer system comprising a serial-data line for transferring data; a serial-clock line for transferring clock signals which control the data transfer; at least one master device on a controlling side and a plurality of slave devices on a controlled side that are connected via the serial-data line and the serial-clock line, wherein the master device comprises a means for performing data communication with the slave devices via the serial-data line and the serial-clock line, and each of the slave devices comprises a means for performing data communication with the master device via the serial-data line and the serial-clock line, a means for comparing address information transmitted from the master device and inherent address specific to the slave device, a means for comparing the address information and a common address preset in a plurality of the slave devices, a means for outputting an acknowledge signal when the inherent address is specified as the address information, and a means for outputting an acknowledge signal when the common address is specified as the address information; and a means for outputting the acknowledge signal with combination of logics which are outputted from a plurality of the slave devices, each having the common address, to the serial-data line when the common address is specified.

According to the present invention, there is provided a serial-data transfer system for connecting at least one master device on a controlling side and a plurality of slave devices on a controlled side via a serial-data line for transferring data and a serial-clock line for transferring clock signals which control the data transfer, transmitting address information as one item of the data from the master device to the slave devices to specify a predetermined one of the slave devices, performing serial transfer of the data between the master device and the predetermined one of the slave devices which has been specified using the address information, and transferring an acknowledge signal from the specified one of the slave devices to the master device upon completion of the transfer of the data, wherein each of the slave devices comprises a means for performing data communication with the master device via the serial-data line and the serial-clock line, a means for comparing the address information and inherent addresses specific to the individual slave devices, a means for comparing the address information and a common address preset in the plurality of the slave devices, a means for outputting acknowledge signal when the inherent addresses are specified as the address information, and a means for outputting acknowledge signal when the common address is specified as the address information.

In this case, the slave device may further comprise a first register and a second register in one of which the data transmitted from the master device is stored corresponding to the state of a select signal, wherein outputs of the first register are transmitted directly to a apparatus connected to each of the slave devices, and outputs of the second register are connected in two ways to the apparatus connected to each of the slave devices via an input/output (I/O) port.

According to another aspect of the present invention, there is provided a serial-data transfer system wherein at least one master device on a controlling side and a plurality of slave devices on a controlled side are connected via a serial-data line for transferring data and a serial-clock line for transferring clock signals that control the data transfer; in a normal mode, address information corresponding to an inherent address of each of the slave devices is transmitted from the master device to each of the slave devices, and interactive data communication is performed between the master device and the slave device having an inherent address matching the address information; and in a local mode, address information corresponding to inherent addresses is serially transmitted from the master device to a plurality of the slave devices which is intended to be specified, thereby specifying an optional number of the slave devices and concurrently transmitting the same data to the specified number of the slave devices.

In the above serial-data transfer system, according to detection of the number of variations of an serial data signal SDA from a high level to a low level while an serial clock signal is at a high level, detection may be performed whether the transfer mode is either the normal mode or a mode 1 of the local mode, that is, a mode wherein an optional number of items of the address information that corresponds to the slave devices intended to be specified is serially transmitted from the master device to specify an optional number of the slave devices which corresponds to the items of the address information.

Also, in the above serial-data transfer system, in the local mode, after the optional number of items of the address information that corresponds to the slave devices intended to be specified is transmitted from the master device, further detection may be performed for the number of variations of the serial data signal SDA from the high level to the low level while the serial clock signal SCL is at the high level, thereby detecting that the transfer mode turns to a mode 2 that allows the same data to be concurrently transmitted to the specified optional number of the slave devices.

Also, in this case, corresponding to the number of drops of the serial data signal SDA, that is, one, two, and three, while the serial clock signal SCL is at the high level, detection may be performed for the normal mode, the mode 1 of the local mode, and the mode 2 of the local mode, respectively.

According to another aspect of the present invention, there is provided a serial-data transfer system comprising a serial-data line for transferring data; a serial-clock line for transferring clock signals which control the data transfer; at least one master device on a controlling side and a plurality of slave devices on a controlled side that are connected via the serial-data line and the serial-clock line, wherein the master device comprises a means for performing data communication with the slave devices via the serial-data line and the serial-clock line, and a transfer-mode specifying device for specifying one of normal mode and a local mode as the transfer mode, the normal mode allowing the master device to transmit address information to the slave devices for specification of a predetermined one of the slave devices if possible and perform one to one interactive transfer of data with the specified one of the slave devices, the local mode allowing the master device to serially transmit an optional number of items of address information which corresponds to items of the slave devices intended to be specified for specification of an optional number of items of the slave devices which corresponds to the items of the address information and to concurrently transmit the same data to the specified optional number of the slave devices; and each of the slave devices comprises a means for performing data communication with the master device via the serial-data line and the serial-clock line, a means for comparing address information and inherent addresses specific to the individual slave devices, a means for detecting whether the transfer mode of the data is the normal mode or the local mode, and a means for outputting acknowledge signal when the inherent addresses are specified as the address information, and a means for outputting acknowledge signals when one of the normal mode and the local mode is specified upon completion of the data transfer from the master device, and a device for outputting the acknowledge signal with combination of logics which are outputted from a plurality of the slave devices, to the serial-data line when the local mode is specified.

In this case, each of the serial-data line and the serial-clock line may be connected to a power source via a pull-up resistor.

Furthermore, according to another aspect of the present invention, there is provided a slave device for connecting at least one master device on a controlling side and a plurality of slave devices on a controlled side via a serial-data line for transferring data and a serial-clock line for transferring clock signals that control the data transfer, transmitting address information as one item of the data received from the master device to the slave devices to specify a predetermined one of the slave devices, performing serial transfer of the data between the master device and the predetermined one of the slave devices which has been specified using the address information, and transferring an acknowledge signal from the specified one of the slave devices to the master device upon completion of the transfer of the data, wherein each of the slave devices comprises a means for performing data communication with the master device via the serial-data line and the serial-clock line, a means for comparing address information and inherent addresses specific to the individual slave devices, a means for detecting whether the transfer mode of the data is the normal mode that allows the master device and the slave devices to perform interactive communication of the data or the local mode that allows the master device to concurrently transmit the same data to a plurality of the slave devices, a means for outputting acknowledge signal through a terminal SDA1 when the normal mode is specified, and a means for outputting acknowledge signal through a terminal SDA2 when the local mode is specified.

DETAILED DESCRIPTION OF PREFERRED EMBODIMENTS

Hereinbelow, referring to examples shown in the accompanying drawings, a detailed description will be given of a first embodiment of a serial-data transfer system according to the present invention.

Figure 1:
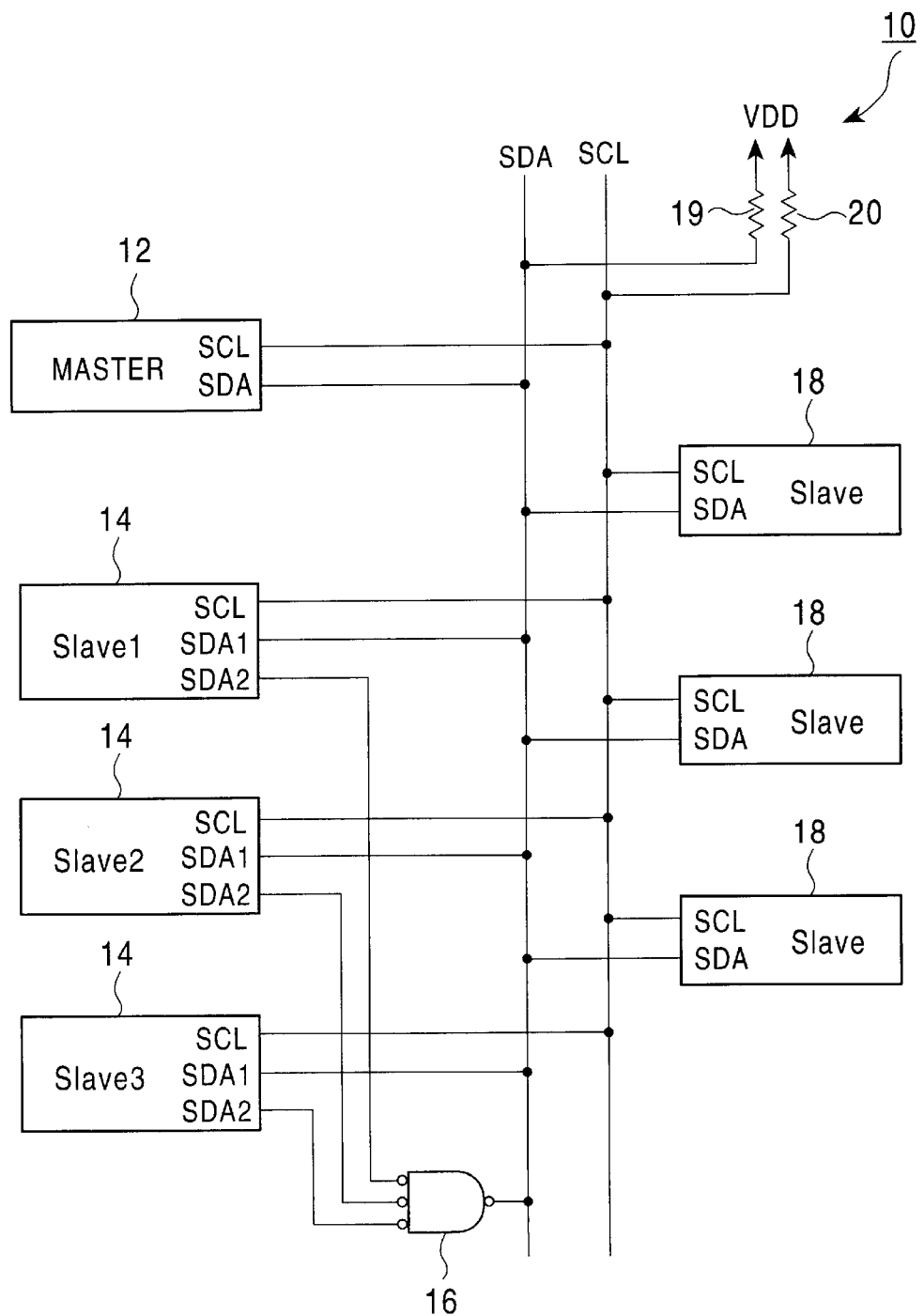
FIG. 1 is a schematic view of a serial-data transfer system according to a first embodiment of present invention.

FIG. 1 is a schematic view showing a configuration of an example of a serial-data transfer system according to the embodiment. In this figure, a serial-data transfer system 10 has a master device 12 (MASTER), slave devices 14 (Slave1 to Slave3) according to the present invention, an OR gate 16, slave devices 18 (Slaves) each having a conventional configuration, pull-up resistors 19 and 20, and a serial-data line SDA, and a serial clock line SCL.

The serial-data line SDA transfers data (including control signals), and the serial clock line SCL feeds clock signals that control data transfer. The serial-data line SDA and the serial clock line SCL are connected to a power source VDD via the pull-up resistor 19 and 20, respectively. An SCL terminal and an SDA terminal of each of the master devices 12 are, respectively, connected to the serial clock line SCL and the serial-data line SDA.

Each of the slave devices 14 is on the side that is controlled by the master device 12. An SCL terminal and an SDA1 terminal of the slave device 14 are connected to the serial clock line SCL and the serial-data line SDA, respectively; and an SDL2 terminal of each of the slave devices 14 is connected to the OR gate 16. The output of the OR gate 16, which is one of outputs of the open drain and the open collector, is connected to the serial-data line SDA.

Similarly to the above, each of the slave devices 18 is on the side that is controlled by the master device 12. An SCL terminal and an SDA terminal of the slave device 18 are connected to the serial clock line SCL and the serial-data line SDA, respectively. Except for the slave devices 14 and the OR gate 16, the master device 12, slave devices 18, pull-up resistors 19 and 20, the serial-data line SDA, and the serial clock line SCL have a conventional configuration.

In the serial-data transfer system 10 of this embodiment, data is serially transferred between the master device 12 and a plurality of slave devices 14 and 18 via the serial-data line SDA and the serial clock line SCL. Data can be interactively transferred between the master device 12 and each of the individual slave devices 14 and 18, and in addition, data can be concurrently transferred from the master device 12 to a plurality of slave devices 14.

Figure 2:
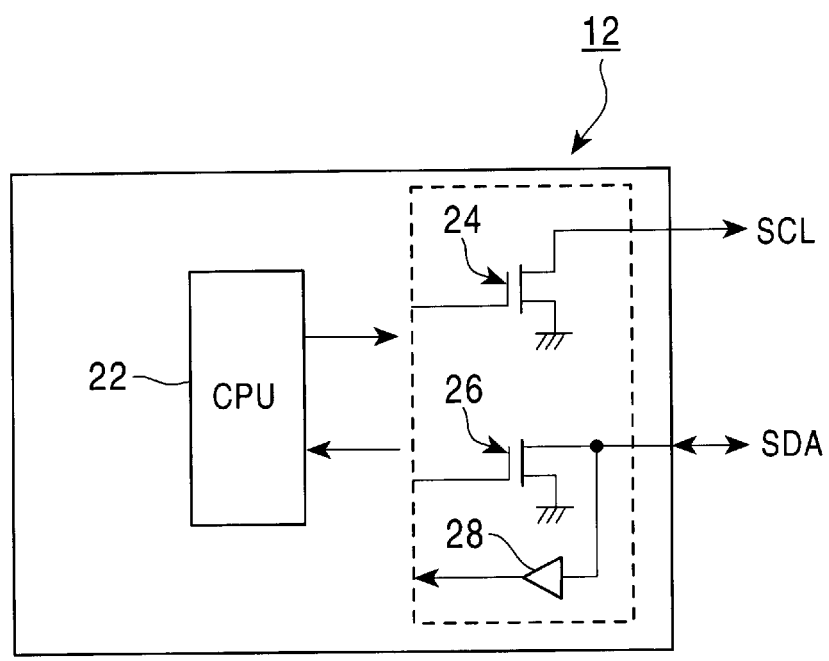
FIG. 2 is a view showing the overall configuration of a master device according to the first embodiment of the present invention.

FIG. 2 is a view showing the overall configuration of an example of a master device.

As conceptually shown in FIG. 2, a master device 12 has a microcontroller 22 (central processing unit (CPU)), an output buffer 24, an output buffer 26, and an input buffer 28. The output buffer 24 is formed of an n-type metal oxide semiconductor transistor (which is referred to as an NMOS transistor, hereinbelow) of an open-drain type, which drives the serial clock line SCL. The output buffer 26 is formed of an NMOS transistor of the open-drain type, which drives the serial-data line SDA.

In the master device 12, various processing are performed as follows. The microcontroller 22 controls the total operation according to a predesigned program. The output buffer 24 outputs clock signals to the serial clock line SCL. The output buffer 26 outputs data that will be transferred to the serial-data line SDA. Also, the input buffer 28 receives data, which will be received from the serial-data line SDA.

Figure 3:
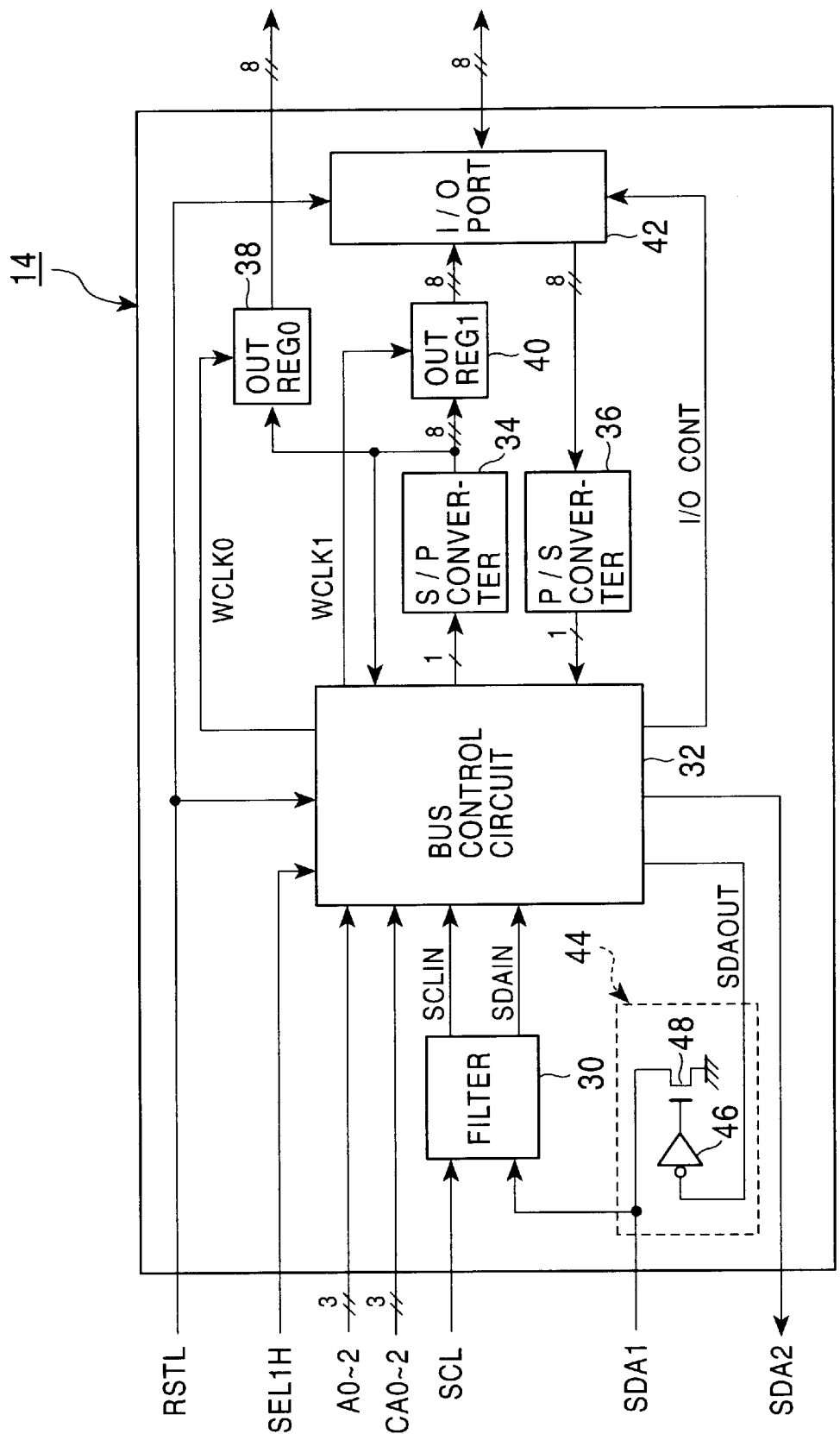
FIG. 3 is a schematic view showing a configuration of a slave device according to the first embodiment of the present invention.

FIG. 3 is a schematic view showing a configuration of an example of a slave device according to the first embodiment of the present invention.

A slave device 14 has a circuit configuration specific to this embodiment. As shown in FIG. 3, the slave device 14 has a filter 30, a bus control circuit 32, a serial/parallel (S/P) converter 34, a parallel/serial (P/S) converter 36, output registers 38 (OUTREG0) and 40 (OUTREG1), an input/output (I/O) port 42, and an input/output (I/O) buffer 44 (output side).

In the slave device 14, first, a serial clock signal SCL to be outputted to the serial clock line SCL and a serial data signal SDA1 to be outputted to the serial-data line SDA are inputted to the filter 30. The serial clock signal SCL and the serial data signal SDA1 are filtered through the filter 30 for elimination of noise and are outputted therefrom as a serial-clock input signal SCLIN and a serial-data input signal SDAIN, respectively.

The serial-clock input signal SCLIN and the serial-data input signal SDAIN that have been outputted from the filter 30 are inputted to the bus control circuit 32. In addition, other signals and data are inputted to the bus control circuit 32. They are a reset signal RSTL, a select signal SEL1H, inherent address signals A0 to A2, common-address signals CA0 to CA2, parallel data outputted from the S/P converter circuit 34, and serial data outputted from the P/S converter circuit 36.

The reset signal RSTL resets and initializes the slave device 14. For example, the slave device 14 is reset when the signal is at a low level. The select signal SEL1H selects which one of output registers 38 and 40 is used to store parallel data after S/P conversion. For example, when the select signal SEL1H is at a high level, the output register 40 is selected to store the parallel data after the S/P conversion.

In the serial-data transfer system 10, for example, 7-bit address information is transmitted from the master device 12 to the slave devices 14 and 18 to specify desired slave devices 14 and 18. The inherent address data A0 to A2 is used to set an inherent address unique to each of the slave devices 14. The common-address data CA0 to CA2 is used to set a common address that is common to a prespecified plurality of slave devices 14. These items of data are preset in a register or a read-only memory (ROM) 49 in each of the slave devices 14 and 18 (the register and the ROM are not shown in the schematic configuration view in FIG. 3).

The bus control circuit 32 controls the total operation of the slave device 14. The bus control circuit 32 outputs write-clock signals WCLK0 and WCLK1, an I/O control signal I/OCONT, a serial-data outputs SDAOUT, and a serial-data outputs SDA2 in addition to items of serial data that are obtained through the serial-clock input signals SCLIN that serially control the serial-data input signals SDAIN inputted from the filter 30.

The write-clock signals WCLK0 and WCLK1 are clock signals that are used to store items of the S/P-converted parallel data outputted from the S/P converter circuit 34 in the individual output registers 38 and 40. For example, when the select signal SEL1H is at a low level, the write-clock signal WCLK0 is outputted; when the select signal SEL1H is at a high level, the write-clock signal WCLK1 is outputted.

In the serial-data transfer system 10 of this embodiment, subsequent to the aforementioned address information, a 1-bit data-control signal is transmitted. The 1-bit data-control signal represents either a data-write to the slave devices 14 or a data-read of data outputted from the slave devices 14. According to the state of the data-control signal, the I/O control signal I/OCONT switches the input/output (I/O) direction between each of the slave devices 14 and a apparatus connected to the slave devices 14 (which is referred to as a connected apparatus, hereinbelow).

When the data-control signal is at the low level, it represents a command for a data-write from the master device 12 to the slave devices 14 and 18; therefore, the master device 12 sends data to the connected apparatuses via the slave devices 14 and 18. In contrast, when the data-control signal is at the high level, it represents data-read from the slave devices 14 and 18 to the master device 12; therefore, the master device 12 receives data from the connected apparatuses via the slave devices 14 and 18.

Figure 4:
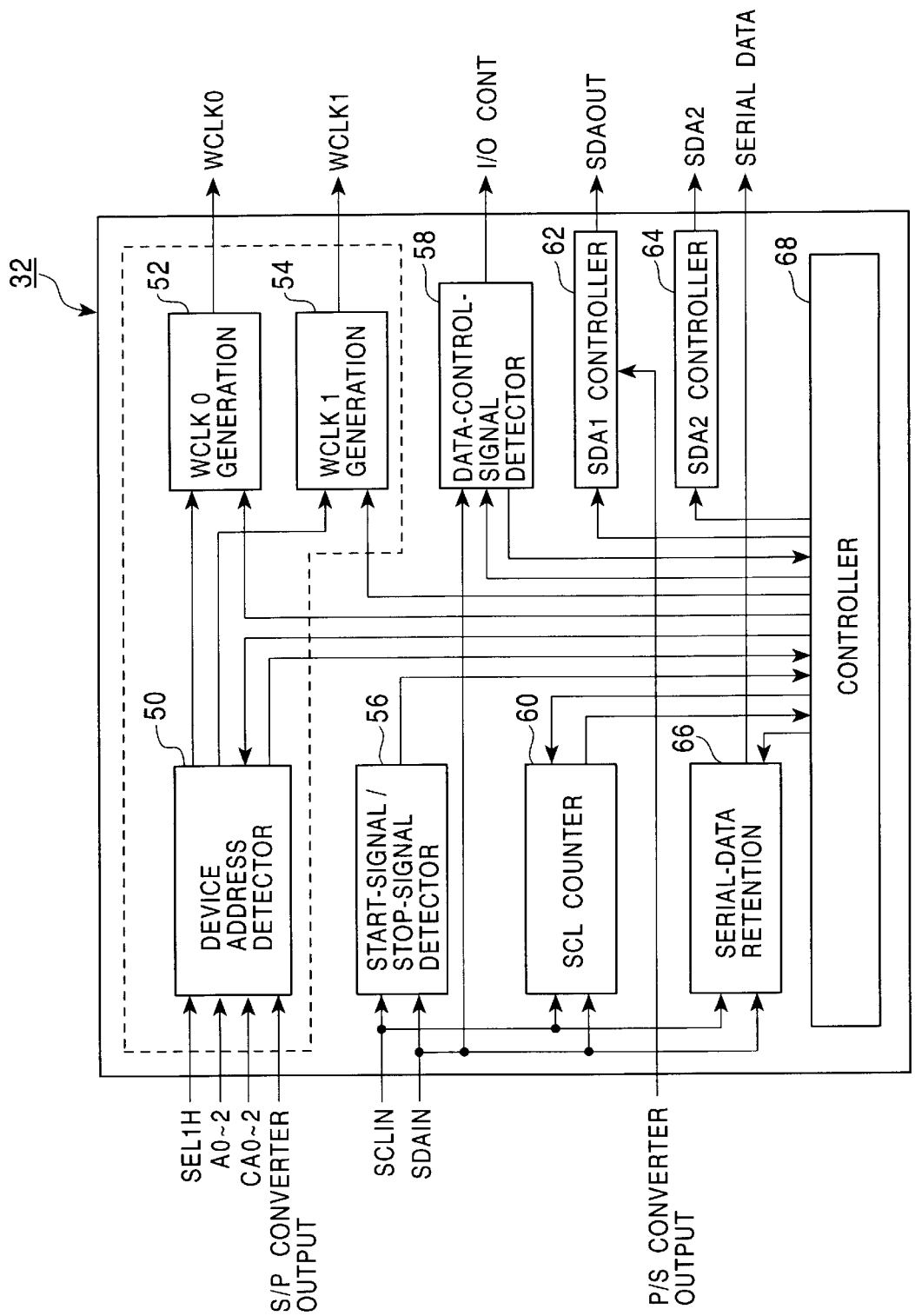
FIG. 4 is a schematic view showing a configuration of a bus control circuit used in the slave device according to the first embodiment of the present invention.

FIG. 4 is a schematic view showing a configuration of an example of a bus control circuit.

The bus control circuit 32 has a device-address detector circuit 50, a WCLK0 generator circuit 52, a WCLK1 generator circuit 54, a start-signal/stop-signal detector circuit 56, a data-control-signal detector circuit 58, an SCL counter 60, an SDA1 controller 62, an SDA2 controller 64, a serial-data retention circuit 66, and a controller 68.

The controller 68 controls the total operation of the bus control circuit 32. The controller 68 issues various control signals to all the aforementioned component members except for the start-signal/stop-signal detector circuit 56; they are the device-address detector circuit 50, the WCLK0 and WCLK1 generator circuits 52 and 54, the data-control-signal detector circuit 58, the SCL counter 60, the SDA1 and SDA2 controllers 62 and 64, and the serial-data storing circuit 66.

Subsequently, the start-signal/stop-signal detector circuit 56 receives inputs of the serial-clock input signal SCLIN and the serial-data input signal SDAIN. Then, the start-signal/stop-signal detector circuit 56 detects a start signal (START) that represents starting data transfer. It also detects a stop signal (STOP) that represents terminating the data transfer. The result of the detection performed by the start-signal/stop-signal detector circuit 56 is inputted to the controller 68.

Basically, in the serial-data transfer system 10 of this embodiment, the serial-data input signal SDAIN varies while the serial-clock input signal SCLIN is at a high level. While the serial-clock input signal SCLIN is at a low level, the start-signal/stop-signal detector circuit 56 references variation from the high level to the low level of the serial-data input signal SDAIN, thereby detecting the start signal. Similarly, in the above state, the start-signal/stop-signal detector circuit 56 references variation from the low level to the high level of the serial-data input signal SDAIN, thereby detecting the stop signal.

Subsequently, the device-address detector circuit 50 receives an input of the select signal SEL1H, inherent address data A0 to A2, common-address data CA0 to CA2, and parallel data fed from the S/P converter circuit 34. The device-address detector circuit 50 compares the S/P conversion output (address information) with the individual inherent address data A0 to A2 and common-address data CA0 to CA2 that are prespecified in the individual slave device 14.

The result of the comparison performed by the device-address detector circuit 50 is inputted to the controller 68, and in addition, to the WCLK0 and WCLK1 generator circuits 52 and 54. When the data-control signal specifies a data-write from the master device 12 to the slave devices 14, the WCLK0 and WCLK1 generator circuits 52 and 54 that have received the comparison result from the device-address detector circuit 50 generate the aforementioned write-clock signals WCLK0 and WCLK1, respectively, according to the state of the select signal SEL1H.

Figure 5:
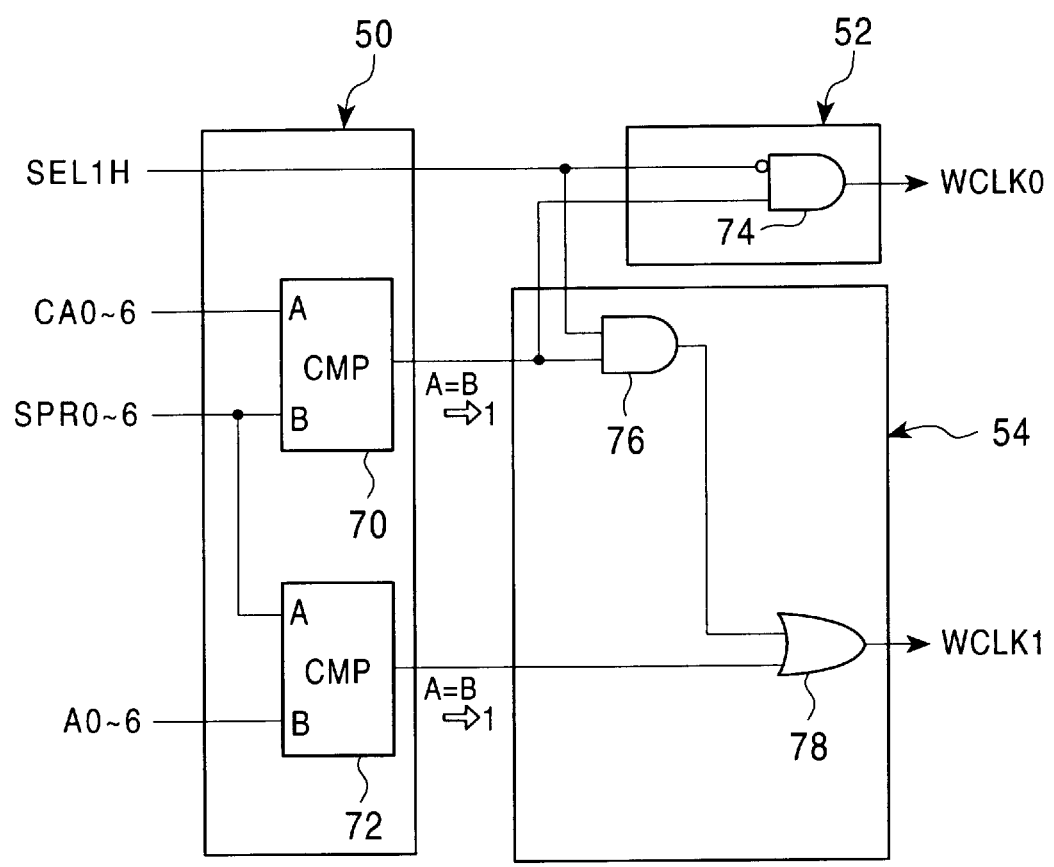
FIG. 5 is a configurational circuit diagram of an example of each of the device-address detector circuit and the WCLK generator circuit that are used in the slave device according to the first embodiment of the present invention.

FIG. 5 is a configurational circuit diagram of an example of each of the device-address detector circuit and the WCLK generator circuit. This figure corresponds to the portion surrounded by a dotted line in FIG. 4. The device-address detector circuit 50 has two comparators 70 and 72 (CMPs). The WCLK0 generator circuit 52 has an AND gate 74, and the WCLK1 generator circuit 54 has an AND gate 76 and an OR gate 78.

In the device-address detector circuit 50, the comparator 70 receives inputs of common-address data CA0 to CA6 and S/P conversion outputs SPR0 to SPR6. Similarly, the comparator 72 receives inputs of inherent address data A0 to A6 and the S/P conversion outputs SPR0 to SPR6. The comparators 70 and 72 compare the signals inputted, respectively. As a result, when the comparator 70 and 72 detect matched signals, they produce high-level outputs; whereas, when they detect unmatched signals, they produces low-level outputs.

The inherent address data A0 to A2 and the common-address data CA0 to CA2 of the inherent address data A0 to A6 and the common-address data CA0 to CA6 are the data shown in FIG. 3. Considering compatibility with, for example, standards of the inter-IC control (IIC) bus, the inherent address data A3 to A6 and the common-address data CA3 to CA6 should be one of fixed values '0100' and '0111'. Also, the S/P conversion outputs SPR0 to SPR6 represent address information after the S/P conversion.

The comparison result is inputted to one of the terminals of each of the AND gates 74 and 76, and the select signal SEL1H is inputted to the other one of the terminals of each of the AND gates 74 and 76. The AND gate 74 outputs a write-clock signal WCLK0, and the AND gate 76 produces an output that is inputted to one of the terminals of the OR gate 78. The result of the comparison by the comparator 72 is inputted to the other one of the terminals of the OR gate 78, and the OR gate 78 outputs a write-clock signal WCLK1.

In this way, when the common-address data CA0 to CA6 match the S/P conversion outputs SPR0 to SPR6, and also, the select signal SEL1H is at the low level, the write-clock signal WCLK0 turns to a high level, that is, an active state. On the other hand, the write-clock signal WCLK1 turns to a high level in the following two cases. One of the cases is that the inherent address data A0 to A6 match the S/P conversion outputs SPR0 to SPR6 and also, the select signal SEL1H is at the high level. The other one of the cases is that the common-address data CA0 to CA6 match the S/P conversion outputs SPR0 to SPR6, and also, the select signal SEL1H is at the high level.

Subsequently, the data-control-signal detector circuit 58 receives an input of the serial-data input signal SDAIN. Then, the data-control-signal detector circuit 58 detects the data-control signal, thereby, determines whether the data-control signal requires either a data-write from the master device 12 to the slave devices 14 and 18 or a data-read from the slave devices 14 and 18 to the master device 12, and thereby, generates an I/O control signal I/OCONT. The result of the determination for one of the data-write and the data-read is also inputted to the controller 68.

The SCL counter 60 receives inputs of the serial-clock input signals SCLIN and the serial-data input signals SDAIN. In data communication, the data is transferred, for example, in units of 8 bits (1 byte). Therefore, the SCL counter 60 counts the serial-clock input signals SCLIN on the basis of the start signal, thereby adjusting timing of sending and receiving of data. The SCL counter 60 outputs the count result to the controller 68.

Similarly to the above, the serial-data retention circuit 66 also receives inputs of the serial-clock input signals SCLIN and the serial-data input signals SDAIN. The serial-data retention circuit 66 serially stores the serial-data input signals SDAIN in synchronization with the serial-clock input signals SCLIN. The serial signals thus stored in the serial-data retention circuit 66 are serially outputted to the S/P converter circuit 34, as shown in FIG. 3.

The SDA1 controller 62 receives an input of the serial data fed by the P/S converter circuit 36 (which is the P/S conversion output). The SDA1 controller 62 outputs the serial data to the I/O buffer 44 as a serial-data output SDAOUT. Also, with a common address specified, the SDA2 controller 64 outputs an acknowledge signal according to control by the controller 68.

At the time of a data-write, the bus control circuit 32 outputs serial data to the S/P converter circuit 34. The S/P converter circuit 34 converts the serial data fed from the bus control circuit 32 to, for example, 8-bit parallel data. The parallel data after the S/P conversion is fed back to the output registers 38 and 40, and in addition, to the bus control circuit 32 for comparison with the inherent address data A0 to A2 and the common-address data CA0 to CA2.

Subsequently, according to the aforementioned write-clock signals WCLK0 and WCLK1 individually inputted from the bus control circuit 32, the respective output registers 38 and 40 store, for example, 8-bit parallel data. The parallel data stored in the output register 38 is outputted to the connected apparatus of the slave devices 14. The output register 40 outputs the parallel data to the I/O port 42.

The I/O port 42 and the connected apparatus are bi-directionally connected. This is suitable to data communication between the slave device 14 and the connected apparatus. On the other hand, the parallel data stored in the output register 38 is directly outputted to the connected apparatus. Therefore, the output register 38 is suited for storing control signals, such as start signals, stop signals, and abort signals, used for controlling the connected apparatuses. Also, the output register 38 may be directly connected to the connected apparatus.

The I/O port 42 also receives inputs of the reset signals RSTL and the I/O control signals I/OCONT that is outputted from the bus control circuit 32 in addition to the aforementioned parallel data. According to the state of the I/O control signals I/OCONT, the I/O port 42 controls as to whether to output the parallel data fed from the output register 40 to the connected apparatus or to output the parallel data fed from the connected apparatus to the P/S converter circuit 36 as described below.

As described above, an 8-bit parallel bus used to bi-directionally connect between the I/O port 42 and the connected apparatus. The parallel data fed from the connected apparatus at the time of data-read is outputted to from the I/O port 42 to the P/S converter circuit 36. The P/S converter circuit 36 converts the 8-bit parallel data to serial data, then outputs the serial data to the aforementioned bus control circuit 32.

The bus control circuit 32 serially outputs the serial data fed from the P/S converter circuit 36 as serial-data output SDAOUT. The serial-data output SDAOUT is inputted to the gate of an NMOS transistor 48 via an inverter 46 in the I/O buffer 44. The source of the NMOS transistor 48 in the I/O buffer 44 is grounded. The drain of the NMOS transistor 48 outputs serial data signals SDA1 to the serial-data line SDA. Thus, the serial-data outputs SDAOUT fed from the bus control circuit 32 are serially outputted from the I/O buffer 44 as serial data signals SDA1.

Reference is made back to the acknowledge signal. The acknowledge signal is outputted from the SDA1 terminal when the inherent address is specified and only one of the slave device 14 is accessed. The acknowledge signals are outputted from the SDA2 terminals when the common address is specified, and all the slave devices 14 are concurrently accessed.

Hereinbelow, a description will be given of data formats used in the serial-data transfer system 10 of the first embodiment according to the present invention.

In this embodiment, a data-processing program is designed to drive the master device 12 to be capable of selectively outputting one of the inherent address and the common address as address information subsequent to the start signal. The description below refers to a normal mode as a mode in which the inherent address is used to specify one of the slave devices 14 and 18. The description refers to a local mode as a mode in which the common address is used to concurrently specify a plurality of slave devices 14 that are prespecified.

Figure 6:
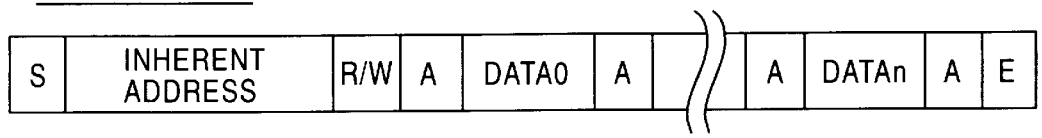
FIG. 6 shows conceptual views of example of data formats according to the first embodiment of the present invention.
Figure 6:
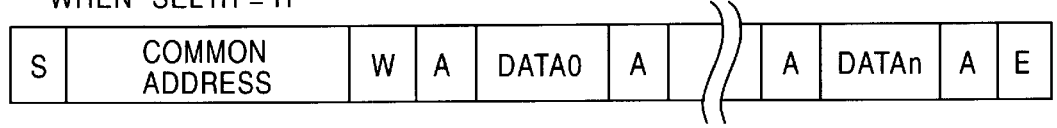
Figure 6:
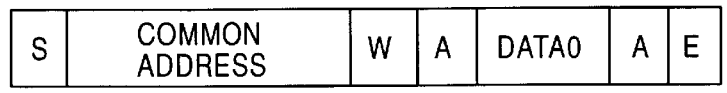

FIG. 6 shows conceptual views of examples of data formats.

In the normal mode, the master device 12 first outputs a start signal (S), then, serially outputs the first-byte data representing an inherent address signal and a data-control signal (R/W). In response, each of the slave devices 14 or 18, in which an inherent address matches the inherent address signal is set, outputs an acknowledge signal.

When a write (W) is specified by the data-control signal, the master device 12 sends data (DATA0 to DATAn) to one of the slave devices 14 or 18, in which an inherent address matching the inherent address signal is set. The active slave device 14 or 18 serially receives the data transmitted from the master device 12; and after receiving, for example, 8-bit (1 byte) data, it outputs the acknowledge signal (A).

When a read (R) is specified, the specified slave device 14 or 18 sends data (DATA0 to DATAn) to the master device 12. The master device 12 serially receives the 8-bit data from the specified slave device 14 or 18. After sending the 8-bit data, the specified slave device 14 or 18 outputs the acknowledge signal (A). Finally, the master device 12 outputs a stop signal (E).

In the local mode, first, when the select signal SEL1H is at the high level, that is, when data is written to the output register 40, the master device 12 outputs the start signal (S). Then, the master device 12 outputs the first byte data representing a common-address signal and a data-control signal (W) that represents data write to the slave devices 14 and 18. Other data formats are the same as in the normal mode.

Alternatively, when the select signal SEL1H is at the low level, that is, when data is written to the output register 38, as in the case where the select signal SEL1H is at the high level, the master device 12 outputs the first byte data, then, sends only the 1-byte data (DATA0) to the slave devices 14 and 18. Subsequently, each of the slave devices 14 outputs the acknowledge signal (A), and the master device 12 outputs the stop signal (E).

Figure 7:
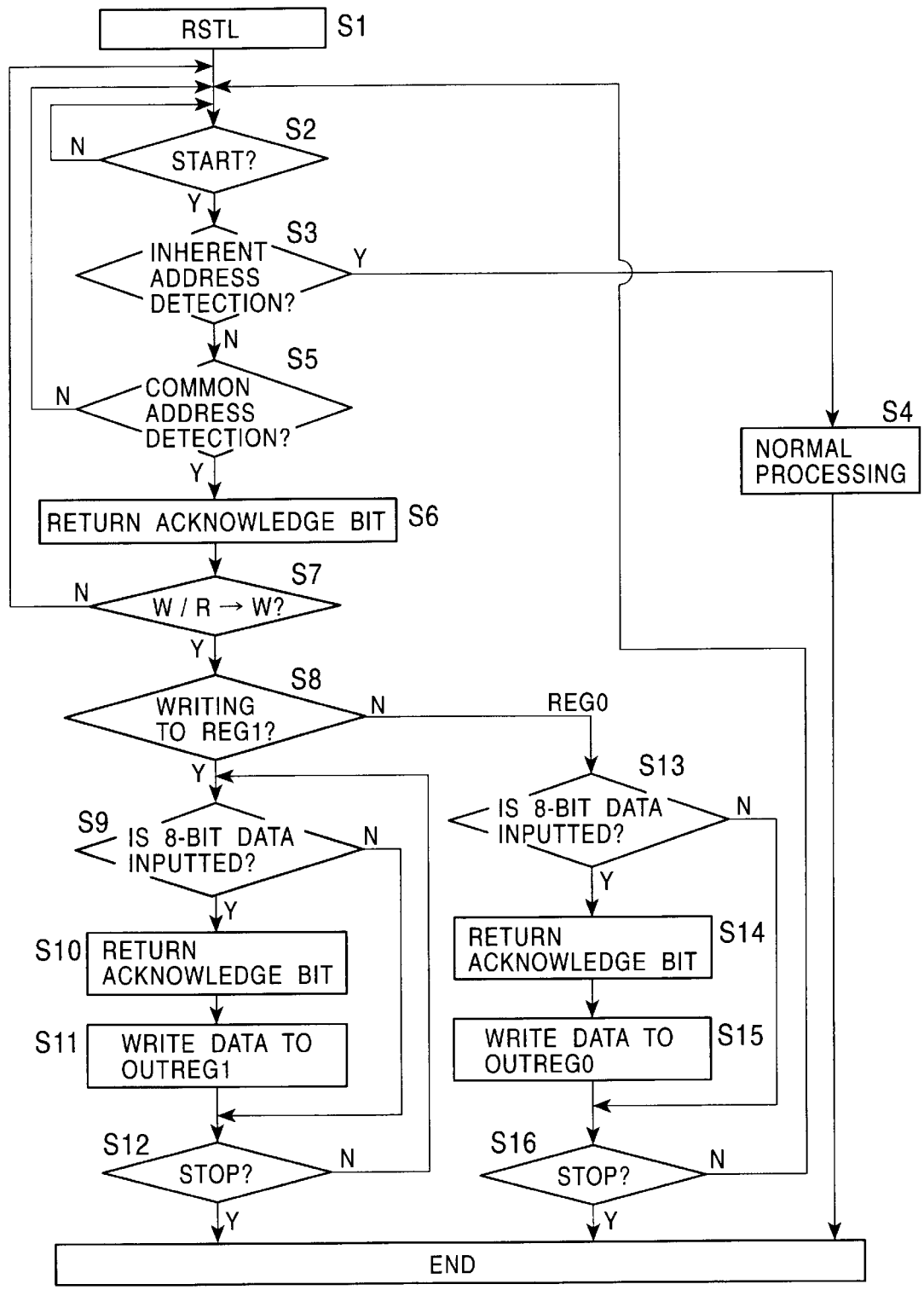
FIG. 7 is a flowchart showing operation of the serial-data transfer system according to the first embodiment of the present invention.

Hereinbelow, referring to a flowchart in FIG. 7, a description will be given of operation of the serial-data transfer system according to this embodiment.

As noted in step S1, first of all, a reset signal RSTL turns to a low level, and the serial-data transfer system 10 is initialized. After the initialization, processing is passed to step S2. In step S2, the slave devices 14 and 18 detect whether or not the master device 12 outputs a start signal (START). If step S2 does not detect the start signal (N (which stands for NO)), the slave devices 14 and 18 repeat the detection until they detect the start signal.

If the start signal is detected (Y (which stands for YES)), all the slave devices 14 and 18 receive the first byte data representing the address information and the data-control signal. As indicated in step S3, each of the slave devices 14 and 18 compares the received address information with the prespecified inherent address, thereby determining whether or not it has been specified. The data comparison in the above is performed according to timing control performed by the SCL counter 60 shown in FIG. 4.

If any of inherent addresses preset in the slave devices 14 or 18 match the transmitted address information (Y), the responsible slave device 14 or 18 enter the normal mode. Then, the active slave device 14 or 18 outputs the acknowledge signal at a low level through the respective SDA1 terminal and SDA terminal. Thereafter, according to the data formats shown in FIG. 6 and standards of the IIC bus, data communication is started between the master device 12 and the slave device 14 or 18.

If the address information issued from the master device 12 does not match inherent addresses of the slave devices 14 and 18, processing is passed to step S5. In step S5, each of the slave devices 14 compares the address information to the preset common address, thereby determining whether or not the address information matches the common address. If the address information matches the common address (Y), processing proceeds to the next step S6. If the address information does not match (N), processing returns to step S2.

In this embodiment, all the slave devices 14 (Slave1 to Slave3) are specified to be active and enter the local mode. As noted in step S6, the acknowledge signals at the low level signal are outputted from all the slave devices 14 through the SDA2 terminals and are inputted to the OR gate 16 (in FIG. 1). Thus, the acknowledge signal at the low level is outputted from the OR gate 16 to the serial-data line SDA. Then, the acknowledge signal is received by the master device 12 and thereby verified for activation of the local mode.

Subsequently, processing proceeds to step S7. Step S7 commands all the slave devices 14 to detect the data-control signal (W/R) according to timing control by the SCL counter 60 shown in FIG. 4. The local mode allows the master device 12 to concurrently access all the slave devices 14, but the master device 12 does not concurrently read data from all the slave devices 14. Therefore, if the data-write (W) is not detected (N), it is determined as an illegal operation, and processing is returned to step S2. If the data-write (W) is detected (Y), processing proceeds to the next step S8. According to the state of the select signal SEL1H, step S8 determines which one of the output registers 38 and 40 is used to store the second byte data. If the second byte data is determined to be stored in the output register 38 (N), processing proceeds to step S13; if it is determined to be stored in the output register 40 (Y), processing proceeds to step S9.

At step S9 where the second byte data is stored in the output register 40 (Y), the serial data is serially received, and determination is performed whether or not the 8-bit (1 byte) data is received according to control performed by the SCL counter 60 shown in FIG. 4. At this time, if no 8-bit data is detected (N), no data is determined to follow, and data transmission is determined to terminate. Accordingly, processing is passed to step S12. If the 8-bit data is inputted (Y), processing proceeds to step S10.

In step S10, all the slave devices 14 output the low-level acknowledge signals through their individual SDA2 terminals, and the OR gate 16 shown in FIG. 1 outputs the low-level acknowledge signals to the serial-data line SDA. The master device 12 detects the acknowledge signal that the serial-data line SDA retains, verifies that all the slave devices 14 received the second byte data, and sends the next data.

On the other hand, as noted in step S11, in each of the slave devices 14, according to the write-clock signal WCLK1 generated by the bus control circuit 32, the output register 40 stores parallel data after S/P conversion is performed by the S/P converter circuit 34.

Subsequently, processing proceeds to step S12, and all the slave devices 14 detect the stop signal. If all the slave devices 14 have detected the stop signal (Y), data transmission from the master device 12 to the slave devices 14 terminates. If the slave devices 14 have not detected the stop signal (N), since the data transmitted from the master device 12 to the slave devices 14 is multiple-byte data, processing returns to step S9 to receive the 8-bit data to follow.

In step S8, if the second byte data is stored in the output register 38 (N), the same operation as in the case where the data is stored in the output register 40 is performed. In specific, data communication is performed according to steps S13 to S16 that correspond to steps S9 to S12. In this embodiment, since the data represented by the control signal that is transmitted is the 1-byte data, if no stop signal is detected in step S16, processing returns to step S2 for repetition.

Basically, the first embodiment of the present invention is as described above.

As modifications, at least one master device 12 is required, but the number thereof may be optionally increased. Also, the number of the slave devices 14 must be at least two, but may be optionally increased. Also, the serial-data transfer system of this embodiment in the normal mode conforms to the IIC-bus standards. Therefore, as shown in the above examples, the slave devices of this embodiment and the slave devices having the conventional configuration may be used together.

In the above examples, specific examples are employed for those such as polarities of the signals, the number of bits, and circuit configurations, in consideration of the compatibility with the IIC-bus standards. However, if the compatibility with the IIC-bus standards is not required, this embodiment is not restricted to the specific examples.

Also, although the serial-data transfer system of the present invention has been described in detail, it is to be understood that the invention is not restricted to the described embodiment. On the contrary, the invention is intended to cover various other modifications and equivalent arrangements included within the spirit and scope of the invention.

As has been described above, the serial-data transfer system of the first embodiment is such that the master device sends address information corresponding to inherent addresses to slave devices, and interactive data communication is implemented between the master device and the slave devices that have the inherent address that matches the address information; alternatively, the master device sends address information corresponding to the common address to slave devices and concurrently sends data to a plurality of slave devices that have been prespecified.

Therefore, according to the serial-data transfer system of the first embodiment, the same data required to be transferred between the master device and the optional number of the slave devices can be transferred at the single-time data transfer operation. For example, the same data that was used to be serially transmitted to seven slave devices in conventional systems can now be transmitted by the single-time transmission operation according to this embodiment of the present invention, thereby allowing time for six transmission operations to be saved. Also, according to this embodiment, registers that directly produce outputs to connected apparatuses are provided, thereby, data-control signals, such as start signals, stop signals, and abort signals, are concurrently transmitted to a plurality of slave devices. This allows concurrent control of a plurality of connected apparatuses to be implemented. For example, this embodiment can be used for any system in which control is required such that a plurality of prespecified random access memories (RAMs) is concurrently cleared, or prespecified devices such as video tape recorders are concurrently started.

Hereinbelow, a detailed description will be given of a second embodiment. FIGS. 1 and 2 used for the first embodiment are also used in the description of this embodiment since the system configuration and the overall configuration of a master device of this embodiment are the same as those of the first embodiment.

Figure 8:
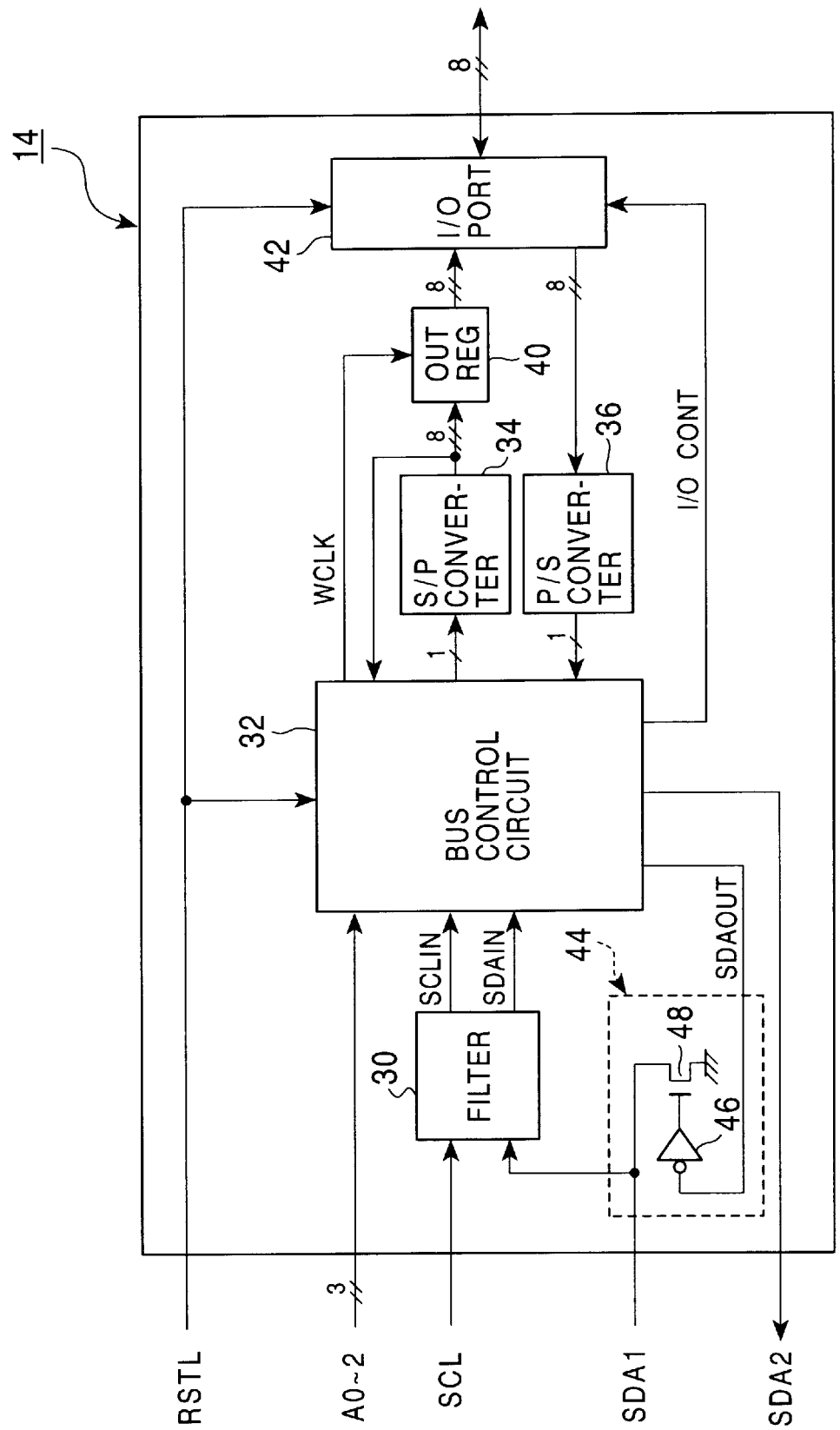
FIG. 8 is a schematic view of an example of a slave device according to a second embodiment of the present invention.

FIG. 8 is a schematic view of an example of a slave device according to the second embodiment.

A slave device 14 has a circuit configuration specific to this embodiment. As shown in FIG. 8, the slave device 14 has a filter 30, a bus control circuit 32, a serial/parallel (S/P) converter circuit 34, a parallel/serial (P/S) converter 36, an output register 40 (OUTREG), an input/output (I/O) port 42, and an input/output (I/O) buffer 44 (output side).

In the slave device 14, first, a serial clock signal SCL to be outputted to the serial clock line SCL and a serial data signal SDA1 to be outputted to the serial-data line SDA are inputted to the filter 30. The serial clock signal SCL and the serial data signal SDA1 are filtered through the filter 30 for elimination of noise and are outputted therefrom as a serial-clock input signal SCLIN and a serial-data input signal SDAIN, respectively.

The serial-clock input signal SCLIN and the serial-data input signal SDAIN that have been outputted from the filter 30 are inputted to the bus control circuit 32. In addition, other signals and data are inputted to the bus control circuit 32. They are a reset signal RSTL, inherent address signals A0 to A2, parallel data outputted from the S/P converter circuit 34, and serial data outputted from the P/S converter circuit 36.

The reset signal RSTL resets and initializes the slave device 14. For example, the slave device 14 is reset when the signal RSTL is at a low level. In the serial-data transfer system 10, for example, 7-bit address information is transmitted from the master device 12 to the slave devices 14 and 18 to specify desired slave devices 14 and 18. The inherent address signals A0 to A2 are used to set an inherent address unique to each of the slave devices 14 or 18.

The bus control circuit 32 controls the total operation of the slave devices 14. The bus control circuit 32 outputs a write-clock signal WCLK, an I/O control signal I/OCONT, serial-data outputs SDAOUT, and serial-data outputs SDA2 in addition to serial data that are obtained through the serial-clock input signals SCLIN that serially control the serial-data input signals SDAIN inputted from the filter 30.

The write-clock signal WCLK is a signal for storing the S/P-converted parallel data outputted from the S/P converter circuit 34 in the output register 40.

In the serial-data transfer system 10 of this embodiment, subsequent to the inherent address, a 1-bit data-control signal is transmitted. The 1-bit data-control signal represents either a data-write to the slave devices 14 or 18, or a data-read of data outputted from the slave devices 14 or 18. According to the state of the data-control signal, the I/O control signal I/OCONT switches the input/output (I/O) direction between each of the slave devices 14 or 18 and a apparatus connected to the slave devices 14 or 18 (which is referred to as a connected apparatus, hereinbelow).

When the data-control signal is at the low level, it represents a data-write from the master device 12 to the slave devices 14 or 18; therefore, the master device 12 sends data to the connected devices via the slave devices 14 or 18. In contrast, when the data-control signal is at the high level, it represents a data-read from the slave devices 14 or 18 to the master device 12; therefore, the master device 12 receives data from the connected devices via the slave devices 14 or 18.

Figure 9:
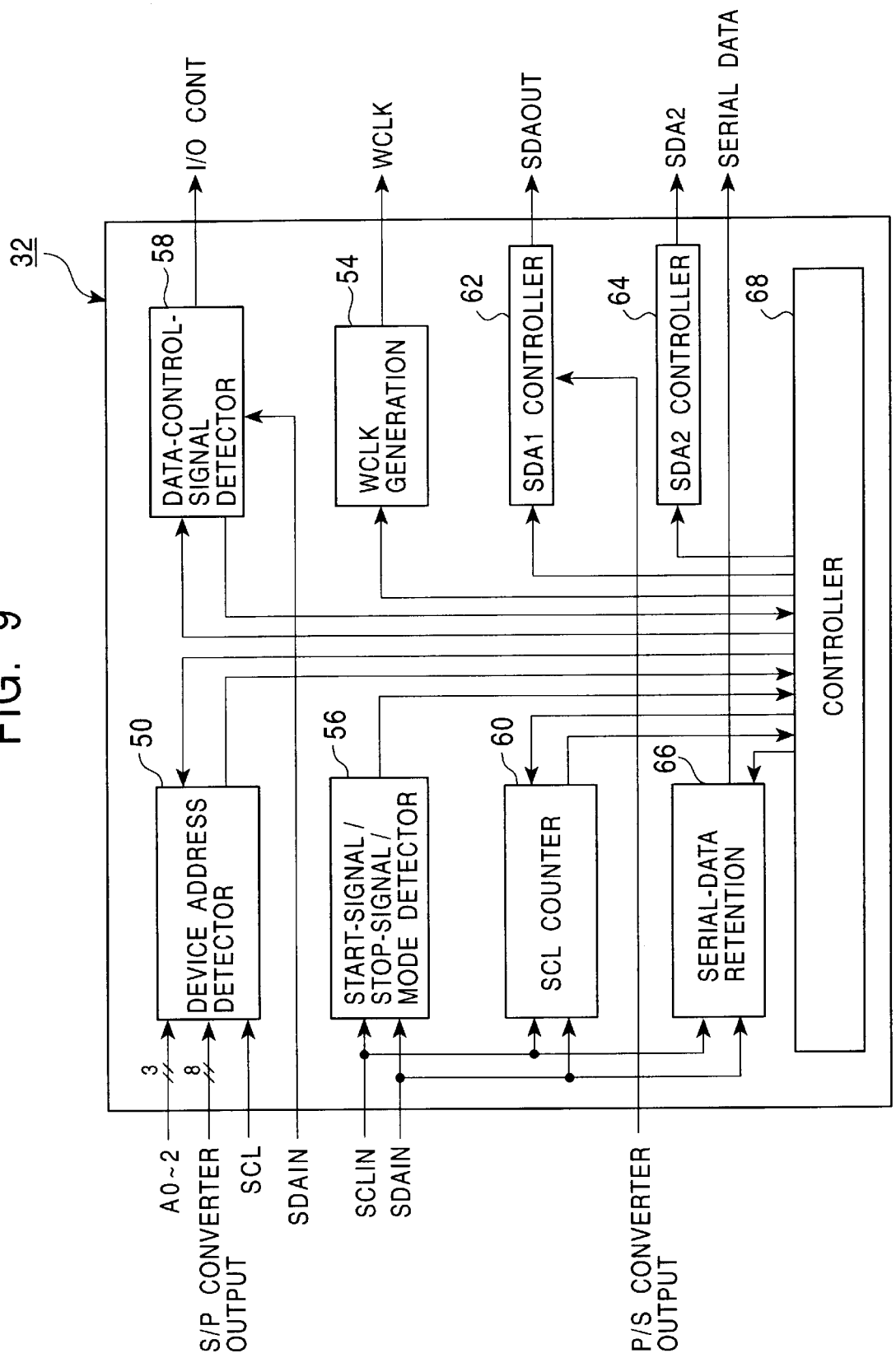
FIG. 9 is a schematic view showing a configuration of an example of a bus control circuit used in the slave device according to the second embodiment of the present invention.

FIG. 9 is a schematic view showing a configuration of an example of a bus control circuit.

The bus control circuit 32 has a device-address detector circuit 50, a WCLK generator circuit 54, a start-signal/stop-signal/mode detector circuit 56, a data-control-signal detector circuit 58, an SCL counter 60, an SDA1 controller 62, an SDA2 controller 64, a serial-data retention circuit 66, and a controller 68.

The controller 68 controls the total operation of the bus control circuit 32. It issues various control signals to all the aforementioned component members except for the start-signal/stop-signal/mode detector circuit 56, they are the device-address detector circuit 50, the WCLK generator circuit 54, the data-control-signal detector circuit 58, the SCL counter 60, the SDA1 and SDA2 controllers 62 and 64, and the serial-data retention circuit 66.

Subsequently, the start-signal/stop-signal/mode detector circuit 56 receives inputs of the serial-clock input signal SCLIN and the serial-data input signal SDAIN. The start-signal/stop-signal/mode detector circuit 56 detects a start signal (START) that represents starting data transfer, a stop signal (STOP) that represents terminating the data transfer, and in addition, transfer modes described below. The result of the detection performed by the start-signal/stop-signal/mode detector circuit 56 is inputted to the controller 68.

Basically, in the serial-data transfer system 10 of this embodiment, the serial-data input signal SDAIN varies while the serial-clock input signal SCLIN is at a low level. While the serial-clock input signal SCLIN is at a low level, the start-signal/stop-signal/mode detector circuit 56 references variation from the high level to the low level of the serial-data input signal SDAIN, thereby detecting the start signal. Similarly, in the above state, the start-signal/stop-signal/mode detector circuit 56 references variation from the low level to the high level of the serial-data input signal SDAIN, thereby detecting the stop signal.

Also, while the serial-clock input signal SCLIN is at the high level, the start-signal/stop-signal/mode detector circuit 56 detects the number of variations of the serial-data input signal SDAIN from the high level to the low level. According to the detection result, the start-signal/stop-signal/mode detector circuit 56 detects whether the transfer mode is a normal mode that has the compatibility with the IIC-bus standards or a local mode according to this embodiment. In the local mode, an optional number of the slave devices 14 is first specified, thereby allowing the same data to be concurrently transmitted to the specified number of the slave devices 14.

Figure 10:
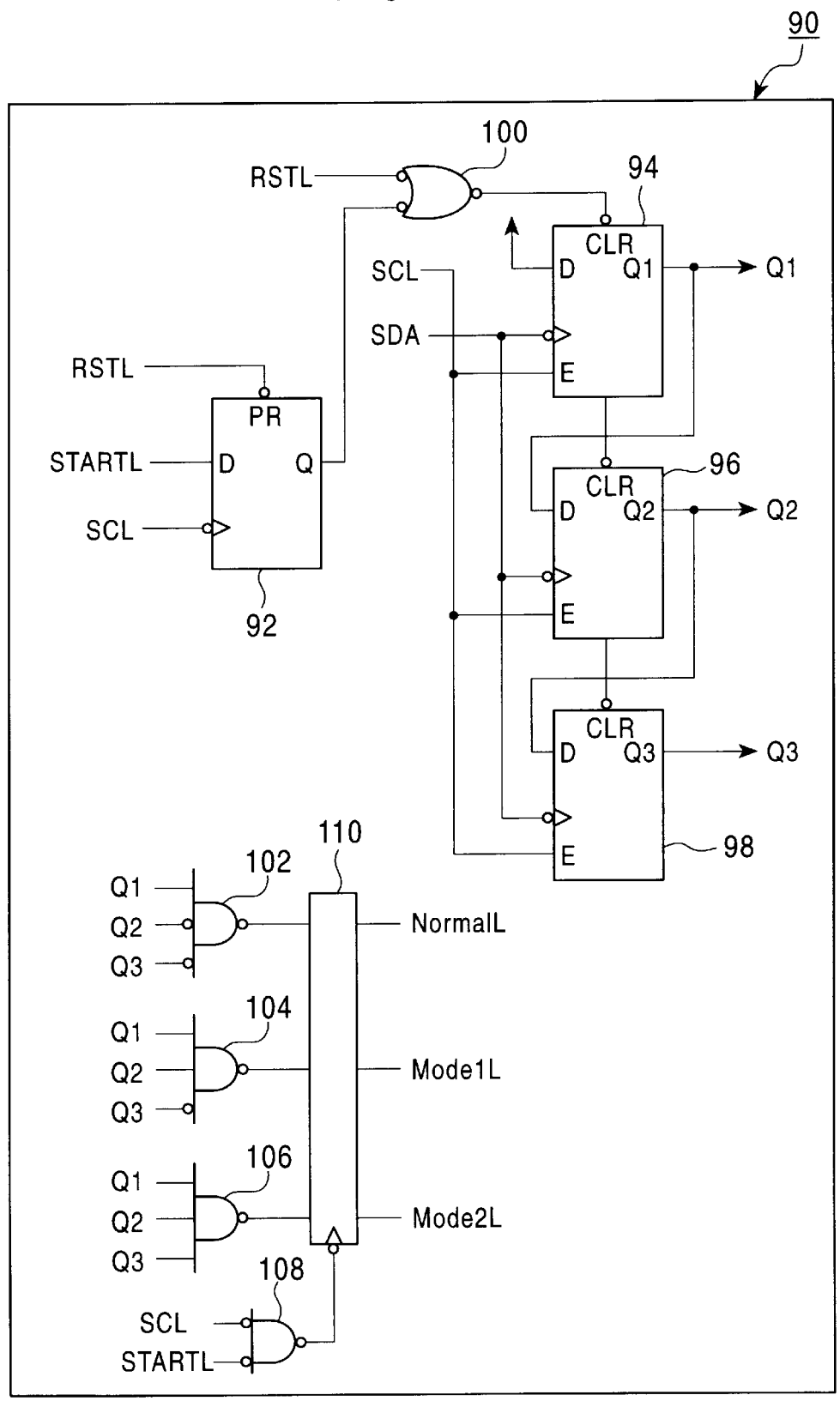
FIG. 10 is a configurational circuit diagram of an example of a mode detector circuit used in the slave device according to the second embodiment of the present invention.

FIG. 10 is a configurational circuit diagram of an example of a mode detector circuit that may be used in the slave device according to the second embodiment of the present invention.

In the circuit shown in the figure, while a serial-clock signal SCL is at a low level, mode detection is made for one of the normal mode, a mode 1 of the local mode, and a mode 2 of the local mode corresponding to the number of drops of the serial clock signal SCL, that is, one time, two times, or three times. In FIG. 10, a mode detector circuit 90 has a flip-flop 92; flip-flops 94, 96, and 98; an AND gate 100; NAND gates 102 104, and 106; an OR gate 108, and a flip-flop 110.

The flip-flop 92 has a D terminal to which start-detection signals STARTL are inputted, a reverse clock terminal to which serial clock signals SCL are inputted, and a PR terminal to which reset signals RSTL are inputted. In addition, the flip-flop 92 has a Q terminal from which output signals to one of the terminals of the AND gate 100. The other one of the terminals of the AND gate 100 receives the reset signals RSTL, and outputs to CLR terminals of the individual flip-flops 94, 96, and 98.

A power source are inputted to a D terminal of the flip-flop 94. Output signals Q1 from a Q1 terminal of the flip-flops 94 are inputted to a D terminal of the flip-flop 96. Output signals Q2 from a Q2 terminal of the flip-flop 96 are inputted to a D terminal of the flip-flop 98. Serial data signals SDA are inputted to reverse clock terminals of the flip-flops 94, 96, and 98. Serial clock signals SCL are inputted to enable signals E of the flip-flops 94, 96, and 98. The output signals Q1 and Q2 of the flip-flops 94 and 96 are inputted to the NAND gates 102 and 104, respectively. Also, output signals Q3 of the flip-flop 98 are inputted to the NAND gate 106.

Outputs of the NAND gates 102, 104, and 106 are individually inputted to a flip-flop 110. From the flip-flop 110, normal signal NormalL, mode-1 signal Mode1L, and mode-2 signal Mode2L are outputted. Also, serial clock signals SCL and start-detection signals STARTL are inputted to the OR gate 108, and outputs of the OR gate 108 are inputted to a reverse terminal of the flip-flop 110.

Figure 11:
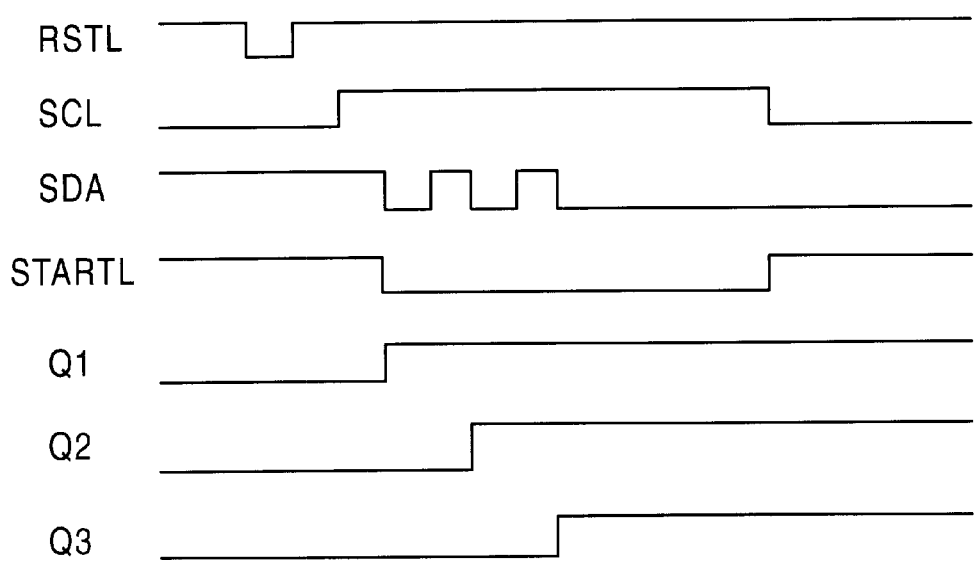
FIG. 11 shows timing charts representing operation of the mode detector circuit shown in FIG. 10.

In the mode detector circuit 90 shown in the figure, as shown timing charts in FIG. 11, when the reset signal RSTL turns to a low level, the flip-flop 92 is preset, and output signal from the Q terminal of the flip-flop 92 turns to a high level. Then, all the flip-flops 94, 96, and 98 are cleared, thereby turning the respective output signals Q1, Q2, and Q3 to a low level.

The reset signal RSTL turns to a high level, and the flip-flops 94, 96, and 98 are released from clear. Thereafter, when the serial data signal SDA turns to a low level while a serial clock signal SCL is at the high level, the start-detection signal STARTL turns to a low level, and also, the output Q1 of the flip-flop 94 turns to a high level.

Subsequently, as shown in the timing charts in FIG. 11, when, for example, the serial data signal SDA drops two times, the respective output signals Q1 and Q2 from the flip-flops 94 and 96 turns to a high level. When the serial data signal SDA drops three times, the output signals Q1, Q2, and Q3 from all the flip-flops 94, 96, and 98 turn to the high level.

These output signals Q1, Q2, and Q3 are inputted to the NAND gates 102, 104, and 106, respectively. When the output signal Q1 is at the high level, and concurrently, the output signals Q2 and Q3 are at the low level; that is, when the serial data signal SDA drops only one time while the serial clock signal is at the high level, the NAND gate 102 produces a low-level output, whereas each of the NAND gates 104 and 106 produces a high-level output.

Similarly, when the output signals Q1 and Q2 are at the high level, and concurrently, the output signal Q3 is at the low level; that is, when the serial data signal SDA drops two times, the NAND gate 102 produces a low-level output, and each of the NAND gates 104 and 106 produces a high-level output. Also, when all the output signals Q1, Q2, and Q3 are at the high level, that is, when the serial data signal SDA drops three times, the NAND gate 106 produces a low-level output, and each of the NAND gates 102 and 104 outputs a high-level output.

Subsequently, while the start-detection signal STARTL is at the low level, the output signals from the NAND gates 102, 104, and 106 are retained in the flip-flop 110 according to the dropped serial clock signal, and are outputted as the normal signal NormalL, the mode-1 signal Mode1L, and the mode-2 signal Mode2L, respectively.

In this embodiment, the case where the normal signal NormalL is at the low level represents the normal mode, and the case where one of the mode-1 signal Mode1L and the mode-2 signal Mode2L is at the low level represents the local mode. The case where the mode-1 signal Mode1L is at a low level represents the mode 1 that allows specification of the optional number of the slave devices 14. Also, the case where the mode-2 signal Mode2L is at a low level represents the mode 2 that allows transmission of the same data from the master device 12 to the specified number of the slave devices 14.

According to the dropped serial clock signals SCL described above, the start-detection signal STARTL at the low level are retained in the flip-flop 92; and the output signals Q1, Q2, and Q3 from the flip-flops 94, 96, and 98 are initialized and turned to the low level. Thereafter, these output signals Q1, Q2, and Q3 turn to the high level. Then, the start-detection signal STARTL turns to the high level, and the high-level start-detection signal STARTL is retained in the flip-flop 92 according to the following dropped serial clock signal SCL. Thereby, the mode detector circuit 90 is returned to the initial state.

In the mode detector circuit 90 shown in the figures, while the serial clock signal is at the high level, according to the detection of the number of variations of the serial clock signal from the high level to the low level, one of the normal signal NormalL, mode-1 signal Mode1L, and mode-2 signal Mode2L turns to the low level.

Subsequently, the device-address detector circuit 50 receives an input of the serial clock signal, inherent address data A0 to A2, and parallel data fed from the S/P converter circuit 34. The device-address detector circuit 50 compares the S/P conversion output (address information) with the individual inherent address data A0 to A2 prespecified in the individual slave device 14. The result of the comparison performed by the device-address detector circuit 50 is inputted to the controller 68.

When the data-control signal specifies a data-write from the master device 12 to the slave devices 14, the WCLK generation circuit 54 generates the aforementioned write-clock signal WCLK according to control by the controller 68.

Subsequently, the data-control-signal detector circuit 58 receives an input of the serial-data input signal SDAIN. Then, the data-control-signal detector circuit 58 detects the data-control signal, thereby, determines whether the data-control signal requires either a data-write from the master device 12 to the slave devices 14 or 18, or a data-read from the slave devices 14 or 18 to the master device 12, and thereby, generates an I/O control signal I/OCONT. The result of the determination for one of the data-write and the data-read is also inputted to the controller 68.

The SCL counter 60 receives inputs of the serial-clock input signals SCLIN and the serial-data input signals SDAIN. In data communication, the data is transferred, for example, in units of 8 bits (1 byte). Therefore, the SCL counter 60 counts the serial-clock input signals SCLIN on the basis of the start signal, thereby adjusting timing of sending and receiving of data. The SCL counter 60 outputs the count result to the controller 68.

Similarly to the above, the serial-data retention circuit 66 also receives inputs of the serial-clock input signals SCLIN and the serial-data input signals SDAIN. The serial-data retention circuit 66 serially stores the serial-data input signals SDAIN in synchronization with the serial-clock input signals SCLIN. The serial signals thus stored in the serial-data retention circuit 66 are serially outputted to the S/P converter circuit 34, as shown in FIG. 8.

The SDA1 controller 62 receives an input of the serial data fed by the P/S converter circuit 36 (which is the P/S conversion output). The SDA1 controller 62 receives the P/S conversion output from the P/S converter circuit 36 and outputs the serial data to the I/O buffer 44 as a serial-data output SDAOUT. Also, when the system is in the local mode, the SDA2 controller 64 outputs an acknowledge signal as required by the controller 68.

At the time of a data-write, the bus control circuit 32 outputs serial data to the S/P converter circuit 34. The S/P converter circuit 34 converts the serial data fed from the bus control circuit 32 to, for example, 8-bit parallel data. The parallel data is fed to the output register 40, and in addition, fed back to the bus control circuit 32 for comparison with the inherent address data A0 to A2 and the common-address data CA0 to CA2.

Subsequently, according to the aforementioned write-clock signal WCLK inputted from the bus control circuit 32, the output register 40 stores, for example, 8-bit parallel data. The output register 40 outputs the parallel data to the I/O port 42.

The I/O port 42 also receives inputs of the reset signal RSTL and the I/O control signal I/OCONT that is outputted from the bus control circuit 32 in addition to the aforementioned parallel data. According to the state of the I/O control signal I/OCONT, the I/O port 42 controls as to whether to output the parallel data fed from the output register 40 to the connected apparatus or to output the parallel data fed from the connected apparatus to the P/S converter circuit 36 as described below.

Parallel bus comprising of 8 bits are used to bi-directionally connect between the I/O port 42 and the connected apparatus. The parallel data fed from the connected apparatus at the time of data-read is outputted from the I/O port 42 to the P/S converter circuit 36. The P/S converter circuit 36 converts the 8-bit parallel data to serial data, then outputs the serial data to the aforementioned bus control circuit 32.

The bus control circuit 32 serially outputs the serial data fed from the P/S converter circuit 36 as serial-data output SDAOUT. The serial-data output SDAOUT is inputted to the gate of an NMOS transistor 48 via an inverter 46 in the I/O buffer 44. The source of the NMOS transistor 48 in the I/O buffer 44 is grounded. The drain of the NMOS transistor 48 outputs serial data signals SDA1 to the serial-data line SDA. Thus, the serial-data outputs SDAOUT fed from the bus control circuit 32 are serially outputted from the I/O buffer 44 as serial data signals SDA1.

Reference is made back to the acknowledge signal. In the normal mode, the acknowledge signal is outputted only from one of the slave devices 14 and the slave devices 18 specified by the inherent address through the SDA1 terminal or the SDA terminal. In the local mode, the acknowledge signals are outputted from the SDA2 terminals of all the slave devices 14.

Figure 12:
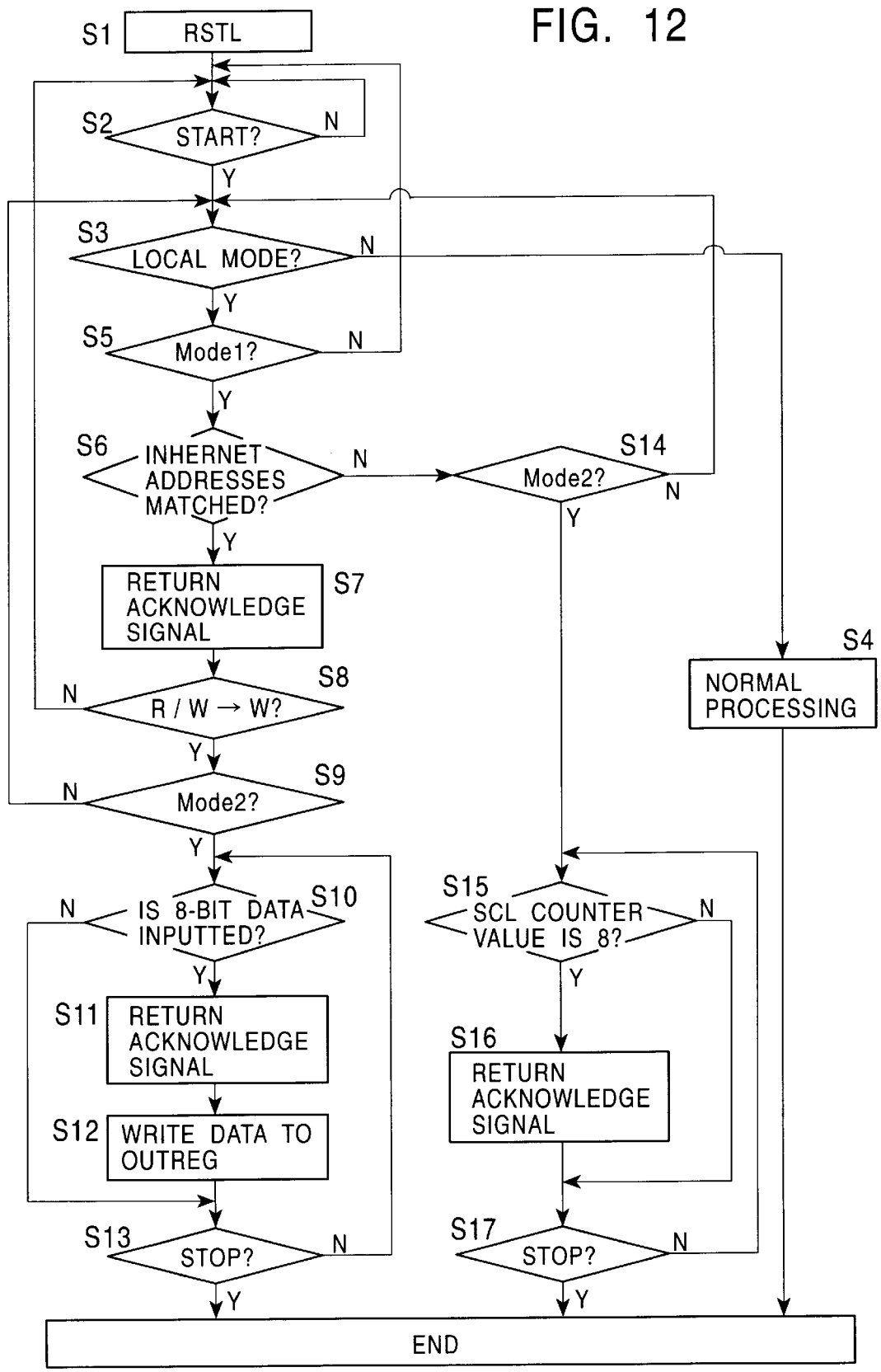
FIG. 12 is a flowchart showing operation of a serial-data transfer system according to the second embodiment of the present invention.

Hereinbelow, referring to a flowchart in FIG. 12, a description will be given of operation of the serial-data transfer system according to this embodiment.

As noted in step S1, first of all, a reset signal RSTL turns to a low level, and the serial-data transfer system 10 is initialized. After the initialization, processing is passed to step S2. In step S2, the slave devices 14 or 18 detect a start signal (START) that the master device 12 outputs. If step S2 does not detect the start signal (N (which stands for NO)), the slave devices 14 or 18 repeat the detection until they detect the start signal (Y (which stands for YES)). If the start signal is detected (Y), the start-detection signal STARTL turns to the low level according to control by a start-signal detector circuit 70.

Subsequently, in step S3, the mode detector circuit 90 detects whether the transfer mode is the normal mode or the local mode. If the transfer mode is determined as the normal mode (N), processing proceeds to step S4. Step 4 performs normal processing according to the IIC-bus standards, thereby allowing interactive data communication to be performed between the master device 12 and each of the slave devices 14 or 18.

If the transfer mode is determined in step S3 as the local mode, processing is passed to step S5 that detects whether or not the transfer mode is the mode 1. As a matter of course, the devices specified in this case are the slave devices 14 according to this embodiment. Detection of a mode other than the mode 1 (N) is regarded as an illegal operation, therefore, processing is returned to step S2. If the mode 1 is detected (Y), the mode-1 signal Mode1L turns to the low level according to control by the mode detector circuit 90.

Subsequently, the master device 12 transmits the first byte data to all the slave devices 14. The first byte data consists of the inherent address data and the data-control signal (only for data-write purposes). Then, as indicated in step S6, according to timing control by the SCL counter 60 shown in FIG. 9, each of the slave devices 14 compares the received inherent address to its own inherent address, thereby, detects whether or not it is specified (step S6).

In step S6, if the first byte data matches the inherent address (Y), as noted in the step S7, each of the slave devices 14 having the matched inherent address outputs the acknowledge signal of a low level from its SDA1 terminal to the serial-data line SDA shown in FIG. 1. Upon receipt of the acknowledge signal, the master device 12 serially transmits, as required, 1-byte data consisting of the inherent address and the data-control signal that correspond to each of the slave devices 14 to be specified. In response, each of the slave devices 14 specified by the inherent address outputs the acknowledge signal.

Repetition of the above operations allows an optional number of the slave devices 14 to be specified. In the local mode, only one slave device 14 may be specified. To specify the single slave devices 14, however, the normal mode is preferably used.

As a result of the detection in the above step, if no matching case in the inherent address is detected (N), processing proceeds step S14 mentioned below.

Subsequently, processing proceeds to step S8. In Step S8, all the slave devices 14 detect the data-control signal (W/R) according to timing control by the SCL counter 60 shown in FIG. 9. The local mode allows the master device 12 to concurrently access to all the optional number of the slave devices 14, but the master device 12 does not concurrently read data from all the slave devices 14. Therefore, if an operation in the case where the data-write (W) is not required (N), the case is determined as an illegal operation, and processing is returned to step S2.

In the above step, if the data-write (W) is required (Y), processing proceeds to the next step S9. Step S9 detects whether or not the transfer mode is the mode 2. If the mode 2 is not detected (N), that is, if the mode representing one of the normal and local mode 1 is detected, the system recognizes the case as a restart command, therefore, returns processing to step S3.

If the mode 2 is detected (Y), the serial data is serially read in. Subsequently, step S10 detects whether or not 8-bit data is received according to control by the SCL counter 60 shown in FIG. 9. If no input of 8-bit data is detected (N), it is determined such that no data to be subsequently processed exists, and the data transmission is due to be terminated. Therefore, processing is passed to step S13. If an input of the 8-bit data is detected (Y), processing proceeds to step S11.

In step S11, low-level acknowledge signals are outputted from the SDA2 terminals of all the specified slave devices 14. Also, together with acknowledge signals from unspecified slave devices 14, which will be outputted in step S16 described below, the low-level acknowledge signal is outputted from the OR gate 16 shown in FIG. 1. The master device 12 detects this acknowledge signal on the serial-data line SDA, thereby, verifies that all the slave devices 14 have received the data and starts transmission of the next data thereto.

In step 12, in each of the specified number of the slave devices 14, the parallel data outputted from the S/P converter circuit 34 is stored in the output register 40. This is carried out according to the write-clock signal WCLK generated by the bus control circuit 32 shown in FIG. 8.

In step S13, the slave devices 14 detect the stop signal. If the slave devices 14 detect the stop signal (Y), the start-detection signal STARTL turns to the low level, thereby terminating data transmission from the master device 12 to the slave devices 14. If the slave devices 14 do not detect the stop signal (N), since the data to be transmitted from the master device 12 to the slave devices 14 comprises of the multiple bytes, processing returns to step S10 to receive the next remaining 8-bit data.

As a result of step S6, the slave devices 14 that does not detect the inherent address that matches the transmitted inherent address detect the mode 2 in step S14. If the mode 2 is not detected (N), that is, if the mode that represents one of the normal and local mode 1 is detected (N), the system recognizes the case as a restart command and returns processing to step S3. If the mode 2 is detected (Y), processing proceeds to step S15. Step S15 detects whether or not the SCL counter 60 has a value of 8. That is, step S15 detects whether the optional number of the slave devices 14 specified using the inherent address has received the 8-bit data. For reference, the unspecified slave devices 14 do not receive (store) data that the master device 12 outputs.

In step S15, if the SCL counter 60 has the value of 8 (Y), processing proceeds to step S16. In step S16, the slave devices 14 unspecified in step S6 also outputs, through its SDA2 terminal, the acknowledge signal with the same timing as in the case where the specified slave device 14 returns the acknowledge signal in step S11. The acknowledge signal is then outputted to the serial-data line SDA via the OR gate 16 shown in FIG. 1, and is received by the master device 12.

If step S15 determines the value of the SCL counter 60 not to be 8 (N), the system recognizes it as a case where no data to follow exists for transmission to the specified slave devices 14. Therefore, the system terminates the transmission and passes processing to step S17. Since step S17 is the same as step S13, a description thereof is omitted.

Hereinbelow, referring to timing charts shown in FIGS. 13 and 14 and practical examples, a description will be given of operation of the serial-data transfer system according to the second embodiment.

Figure 13:
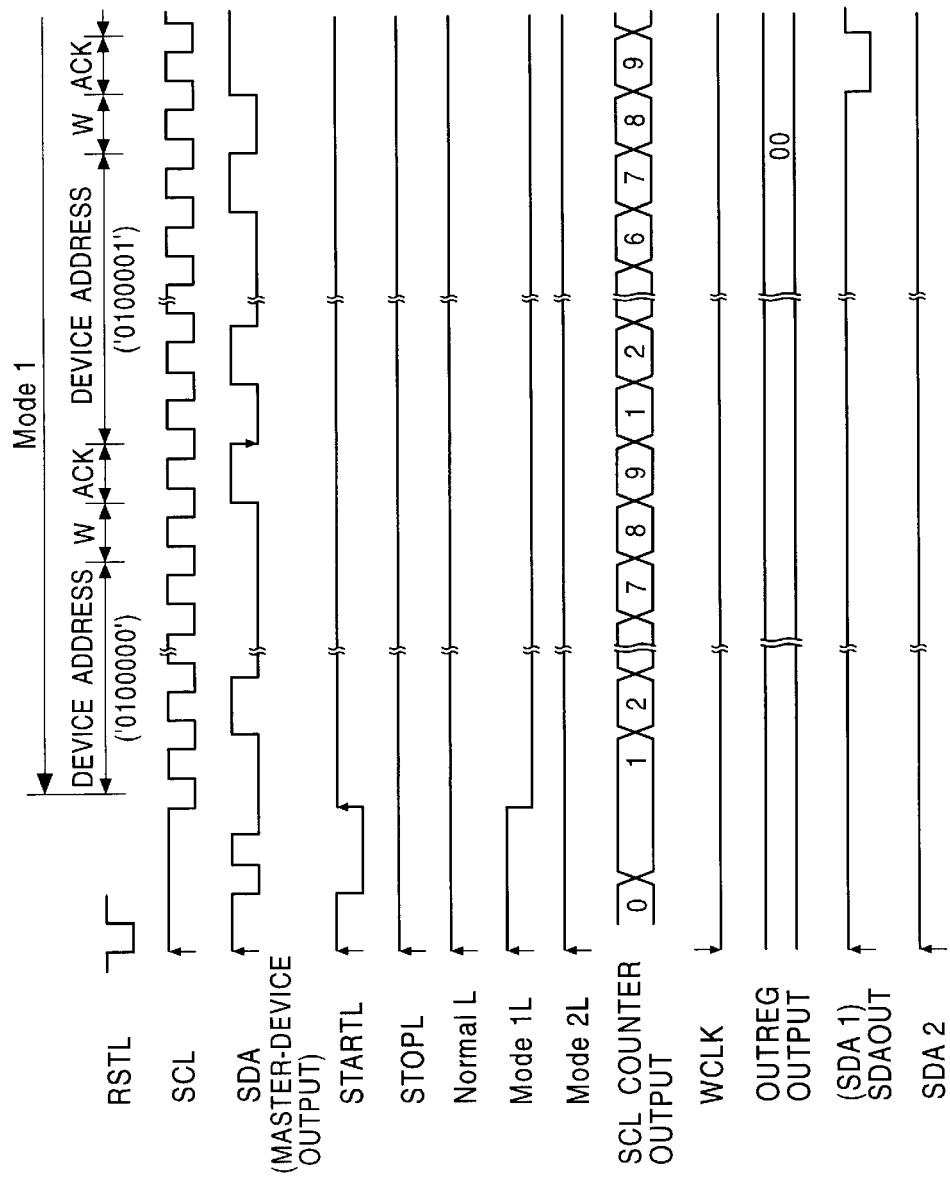
FIG. 13 shows an example of timing charts representing operation of the serial-data transfer system according to the second embodiment of the present invention.
Figure 14:
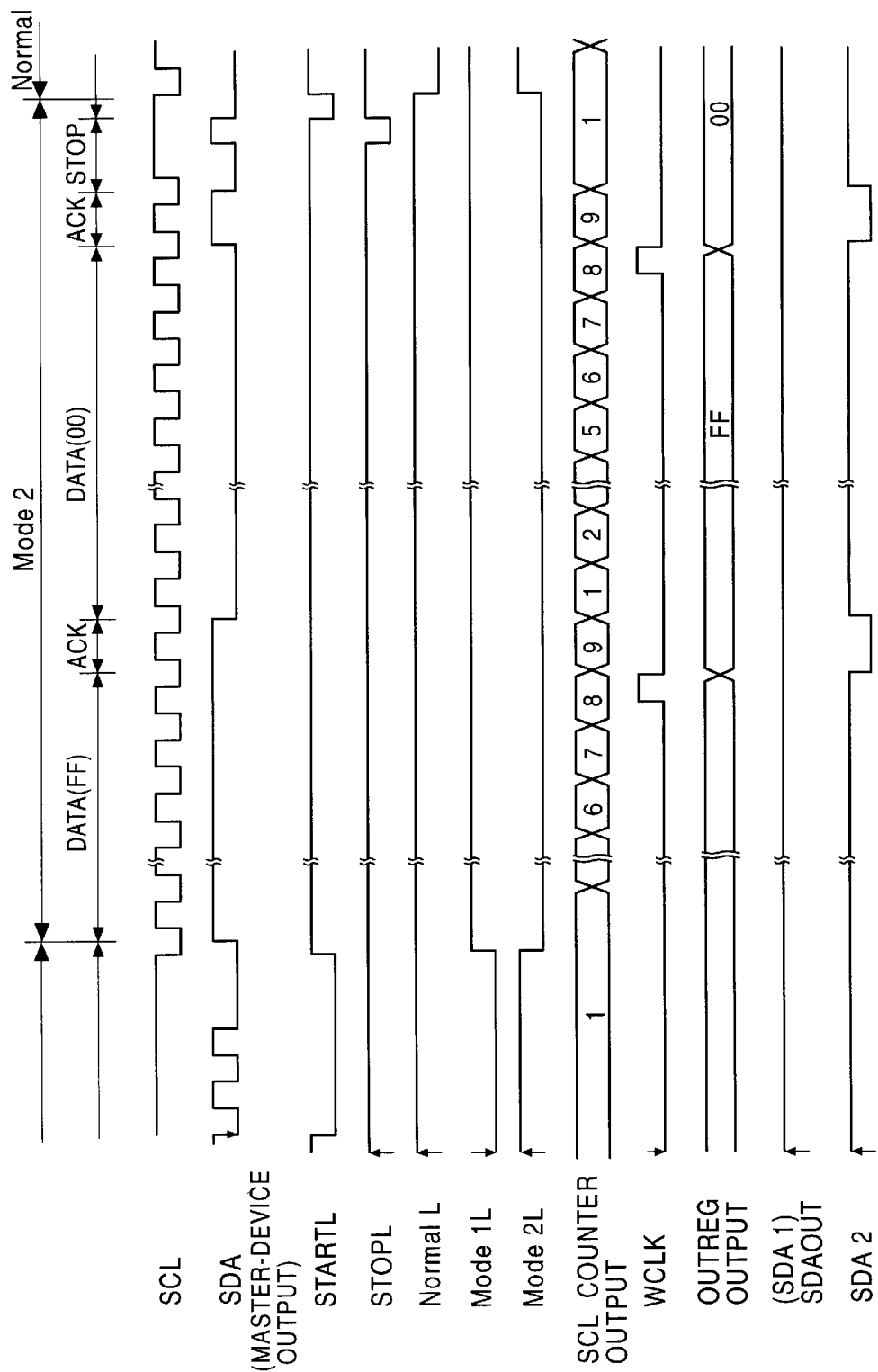
FIG. 14 shows an example of timing charts representing operation subsequent to the operation (shown in FIG. 13) of the serial-data transfer system according to the second embodiment of the present invention.

FIG. 13 shows timing charts that represent example operations when the system enters the mode 1 of the local mode. FIG. 14 shows timing charts that represent example operations subsequent to the operations represented by the timing charts shown in FIG. 13. The operations in FIG. 14 are performed by the serial-data transfer system of the second embodiment when the system shifts from the mode 1 to the mode 2, then, enters the normal mode.

First of all, as shown in FIG. 13, the reset signal turns to the low level, thereby initializing the total serial-data transfer system. After the reset signal RSTL is turned to the high level, the serial data signal SDA is dropped two times while the serial clock signal is at the high level. According to the above, the start-detection signal STARTL turns to the low level during a period when the serial data signal SDA drops for the first time until the serial clock signal SCL drops. In addition, according to the dropped serial clock signal, the mode-1 signal Mode1L turns to the low level and enters the mode 1 of the local mode.

Subsequently, the master device 12 transmits 1-byte data consisting of the inherent address ('0100000') and the data-control signal (W). As have been already described, the data varies while the serial clock signal SCL is at the low level. As the timing charts in FIG. 13 show, during the period when the value of the SCL counter 60 is in a range from 1 to 7, bits representing the numbers 6 to 0 for inherent address are serially transmitted. Also, when the value of the SCL counter 60 is 8, the data-control signals are transmitted.

Subsequently, each of the slave devices 14 receives the 1-byte data consisting of the inherent address and the data-control signal, and compares the inherent address transmitted from the master device 12 with its own inherent address preset. As a result, the slave devices 14 having its own inherent address ('0100000') that matches the inherent address transmitted from the master device 12 outputs, through its SDA1 terminal, the low-level acknowledge signal to the serial-data line SDA. The master device 12 receives the acknowledge signal, thereby, verifies the data transmission.

According to the timing charts shown in FIG. 13, another piece of the 1-byte data consisting of the inherent address ('0100001') and the data-control signal (W) is subsequently transmitted. Similarly, as shown in the timing chart for SDAOUT (SDA1) in FIG. 13, the slave devices 14 having the preset inherent address ('0100001') that matches the transmitted inherent address outputs the acknowledge signal. The master device 12 receives the acknowledge signal, thereby, verifies the data transmission.

Subsequently, as shown in the timing charts in FIG. 14, the serial data signal SDA is dropped three times while the serial clock signal SCL is at the high level. According to the above, the start-detection signal STARTL turns to the low level during a period when the serial data signal SDA drops for the first time until the serial clock signal SCL drops, only the mode-2 signal Mode2L turns to the low level and enters the mode 2 of the local mode.

Subsequently, the master device 12 transmits the 1-byte data. As the timing charts in FIG. 14 show, during the period when the value of the SCL counter 60 is in a range from 1 to 8, bits representing the numbers 7 to 0 for the data (FFh (hexadecimals)) are serially transmitted. Subsequently, all the slave devices 14 individually output acknowledge signals through the SDA2 terminal, and the low-level acknowledge signal are outputted to the serial-data line SDA via the OR gate 16 shown in FIG. 1. The master device 12 receives the acknowledge signal, thereby, verifies the data transmission.

Thus, the acknowledge signals are outputted from all the slave devices 14, including even those unspecified, through their SDA2 terminal. The reason for this is that without the acknowledge signals from the SDA2 terminals of the unspecified slave devices 14, the low-level acknowledge signal cannot be outputted from the OR gate 16 shown in FIG. 1. For this reason, the acknowledge signals must be outputted even from the SDA2 terminals of the unspecified slave devices 14 with the same timing as in the case of the specified slave devices 14.

In this way, the same data are concurrently transmitted to the specified slave devices 14, and after the data is received, the acknowledge signals are outputted from the slave devices 14.

Finally, the serial data signal SDA is allowed to rise while the serial clock signal SCL is at the high level. Thereby, a stop-detection signal STOPL turns to a low level during the period when the serial-data line SDA rises and drops. Also, according to the risen serial data signal SDA, the stop-detection signal STOPL enters the normal mode, and the start-detection signal STARTL turns to the low level.

Basically, the second embodiment of the present invention is as described above.

According to the serial-data transfer system of the second embodiment, the same data required to transferred between the master device and the optional number of the slave devices can be implemented at the single-time data transfer operation. For example, the same data that was used to be serially transmitted to three slave devices in conventional systems can now be transmitted by the single-time transmission operation according to this embodiment of the present invention, thereby allowing time for two transmission operations to be saved.

As modifications, at least one master device 12 is required, but the number thereof may be optionally increased. Also, the serial-data transfer system of this embodiment in the normal mode conforms to the IIC-bus standards. Therefore, as described in the above examples, the slave devices of this embodiment and the slave devices having the conventional configuration may be used together.

In the above examples, specific examples are employed for those such as polarities of the signals, the number of bits, and circuit configurations, in consideration of the compatibility with the IIC-bus standards. However, if the compatibility with the IIC-bus standards is not required, the embodiment is not restricted to the specific examples.

Also, although the serial-data transfer system of the present invention has been described, it is to be understood that the invention is not restricted to the described embodiment. On the contrary, the invention is intended to cover various other modifications and equivalent arrangements included within the spirit and scope of the invention.

What is claimed is:

1. A serial-data transfer system wherein
at least one master device and a plurality of slave devices are connected via a serial-data line for transferring data and a serial-clock line for transferring clock signals;
in a normal mode, an inherent address of each of said slave devices is transmitted from said master device to each of said slave devices, and a slave device having said inherent address that has been specified, outputs an acknowledge signal via a first terminal to said serial-data line; and
in a local mode, a common address common to some of said slave devices is transmitted from said master device to said slave devices, and slave devices having said common address that have been specified, output acknowledge signals via each of different second terminals than said first terminal.

2. A serial-data transfer system according to claim 1, comprising:
a serial-data line for transferring data;
a serial-clock line for transferring clock signals;
at least one master device and a plurality of slave devices that are connected via said serial-data line and said serial-clock line; and at least one logic circuit for outputting an acknowledge signal to said serial-data line in said local mode, wherein
some of said slave devices comprises:
means for comparing address information transmitted from said master device and inherent addresses specific to said individual slave devices,
means for comparing said address information and a common address preset in said slave devices,
means for outputting an acknowledge signal via a first terminal to said serial-data line when said inherent addresses are specified as said address information in said normal mode, and
means for outputting an acknowledge signal via a different second terminal than said first terminal to said logic circuit when said common address is specified as said address information in said local mode.

3. The serial-data transfer system as claimed in claim 2, wherein each of said serial-data line and said serial-clock line is connected to a power source via a pull-up resistor.

4. The serial-data transfer system as claimed in claim 3, wherein at least one logic circuit for outputting an acknowledge signal is OR gate whose inputs are fed from said second terminal of slave devices.

5. The serial-data transfer system as claimed in claim 2, wherein at least one logic circuit for outputting an acknowledge signal is OR gate whose inputs are fed from said second terminal of slave devices.

6. A slave device for connecting at least one master device and a plurality of slave devices via a serial-data line for transferring data and a serial-clock line for transferring clock signals comprises:
means for performing data communication with said master device via said serial-data line and said serial-clock line,
means for comparing address information that is transmitted from said master device via said serial-data line, with an inherent address specific to the slave device,
means for comparing address information that is transmitted from said master device, and a common address preset in the slave device,
means for outputting an acknowledge signal via a first terminal when said inherent address is specified as said address information, and
means for outputting an acknowledge signal via a different second terminal than said first terminal when said common address is specified as said address information.

7. The slave device as claimed in claim 6, further comprising a first register and a second register, in one of said registers said data transmitted from said master device is stored corresponding to the state of a select signal, and outputs of said first register are transmitted directly to an apparatus connected to said slave device, and outputs of said second register are connected bi-directionally to said apparatus connected to said slave device via an input/output (I/O) port.

8. A serial-data transfer system wherein
at least one master device and a plurality of slave devices are connected via a serial-data line for transferring data and a serial-clock line for transferring clock signals;
in a normal mode, an inherent address of each of said slave devices is transmitted from said master device to each of said slave devices, and slave device having said inherent address that has been specified, outputs an acknowledge signal via a first terminal to said serial-data line; and
in a local mode, inherent addresses are transmitted in order from the master device to some of said slave devices, and slave devices having said inherent addresses that have been specified, output acknowledge signal via said first terminal in order, and when the specified number of slave devices receive the same data concurrently from said master device, the specified number of slave devices output acknowledge signals via different second terminal than said first terminal.

9. The serial-data transfer system as claimed in claim 8, wherein, according to detection of the number of variations of an serial data signal SDA from a high level to a low level while a serial clock signal is at a high level, mode detection is performed whether the transfer mode is either said normal mode or a mode 1 of said local mode, that is, a mode wherein an optional number of inherent addresses of the slave devices intended to be specified is transmitted in order from said master device to specify an optional number of the slave devices having the same addresses as that previously transmitted.

10. The serial-data transfer system as claimed in claim 9, wherein, in said local mode, after the optional number of inherent addresses of the slave devices intended to be specified is transmitted from said master device, further mode detection is performed according to detection of the number of variations of the serial data signal SDA from the high level to the low level while said serial clock signal SCL is at the high level, thereby detecting that the transfer mode turns to a mode 2 that allows the same data to be concurrently transmitted from said master device to the specified optional number of said slave devices.

11. The serial-data transfer system as claimed in claim 10, wherein, corresponding to the number of drops of said serial data signal SDA, that is, one, two, and three, while the serial clock signal SCL is at the high level, mode detection is performed for said normal mode, said mode 1 of said local mode, and said mode 2 of said local mode, respectively.

12. A serial-data transfer system according to claim 8, comprising:
a serial-data line for transferring data;
a serial-clock line for transferring clock signals;
at least one master device and a plurality of slave devices that are connected via said serial-data line and said serial-clock line, and at least one logic circuit for outputting an acknowledge signal to said serial-data line in said local mode; wherein
some of said slave devices comprises:
  means for comparing address information transmitted from said master device and inherent address specific to the individual slave device,
  means for outputting an acknowledge signal via a first terminal to said serial-data line when said inherent address is specified as said address information in said normal mode, and
  means for outputting an acknowledge signal via a different second terminal than said first terminal to said logic circuit when the same data have been transmitted concurrently from said master device in said local mode.

13. The serial-data transfer system as claimed in claim 12, wherein each of said serial-data line and said serial-clock line is connected to a power source via a pull-up resistor.

14. The serial-data transfer system as claimed in claim 12, wherein at least one logic circuit for outputting an acknowledge signal is OR gate whose inputs are fed from said second terminal of slave devices.

15. A slave device for connecting at least one master device and a plurality of slave devices via a serial-data line for transferring data and a serial-clock line for transferring clock signals comprises:
  means for performing data communication with said master device via said serial-data line and said serial-clock line,
  means for comparing address information transmitted from said master device and inherent address specific to the slave device,
  means for outputting an acknowledge signal via a first terminal when said inherent address is specified as said address information, and
  means for outputting an acknowledge signal via a different second terminal than said first terminal when the same data have been transmitted concurrently from, said master device.

16. A serial-data transfer system wherein:
at least one master device and a plurality of slave devices are connected via a serial-data line for transferring data and a serial-clock line for transferring clock signals;
in a normal mode, address information corresponding to an inherent address of each of said slave devices is transmitted from said master device to each of said slave devices, and slave device having said inherent address that is specified, outputs an acknowledge signal via a first terminal to said serial-data line; and
in a local mode, address information corresponding to said slave devices which is intended to be specified, is transmitted from the master device to a plurality of said slave devices and concurrently transmitting the same data to the specified number of said slave devices, and the specified number of slave devices that received said same data output acknowledge signals via different second terminals than said first terminal to said serial-data line.

* * * * *